US009807983B2

(12) United States Patent
Yuki et al.

(10) Patent No.: US 9,807,983 B2
(45) Date of Patent: Nov. 7, 2017

(54) DEVICE CONTROL METHOD FOR ESTIMATING A STATE OF AN ANIMAL AND FOR DETERMINING A CONTROL DETAIL FOR AN ELECTRONIC DEVICE

(71) Applicant: Panasonic Intellectual Property Corporation of America, Torrance, CA (US)

(72) Inventors: Yasuhiro Yuki, Kanagawa (JP); Kazuki Funase, Osaka (JP); Mitsuhiro Aso, Osaka (JP); Mina Shimizu, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 64 days.

(21) Appl. No.: 14/823,680

(22) Filed: Aug. 11, 2015

(65) Prior Publication Data

US 2016/0057395 A1 Feb. 25, 2016

(30) Foreign Application Priority Data

Aug. 22, 2014 (JP) ................................ 2014-169727

(51) Int. Cl.
*A01K 29/00* (2006.01)
*G06K 9/00* (2006.01)

(52) U.S. Cl.
CPC .............. *A01K 29/005* (2013.01); *G06K 9/00* (2013.01); *G06T 2210/61* (2013.01)

(58) Field of Classification Search
CPC ........ H04N 7/188; H04N 7/144; H04N 5/225; G06T 7/2006; G06T 2207/10004; G06T 2207/10152; G06T 2207/20076; G06T 2207/30232; G06T 2210/61; A01K 29/005; G06K 9/00
See application file for complete search history.

(56) References Cited

U.S. PATENT DOCUMENTS

2005/0157908 A1 7/2005 Matsugu et al.
2008/0018481 A1* 1/2008 Zehavi ................ A01K 15/021 340/573.1
2011/0082574 A1* 4/2011 Pachet .................. A01K 15/02 700/94
2012/0299731 A1* 11/2012 Triener ................. G01G 17/08 340/573.1
2013/0069978 A1* 3/2013 Tanaka .................... G06K 9/62 345/619
2014/0020635 A1* 1/2014 Sayers ................ A01K 15/021 119/721

FOREIGN PATENT DOCUMENTS

JP 2005-202653 7/2005
JP 2006-318173 11/2006
JP 2006-338476 12/2006

* cited by examiner

*Primary Examiner* — Luong T Nguyen
(74) *Attorney, Agent, or Firm* — Greenblum & Bernstein, P.L.C.

(57) ABSTRACT

An electronic device including: a living thing state estimator that determines whether or not at least an animal other than a human is present in a space based on information on the space in which the electronic device is disposed, and estimates a state of the animal that is determined to be present; and a control detail determiner that determines a control detail for the electronic device, according to a result of the determination or the estimated state of the animal.

20 Claims, 23 Drawing Sheets

HUMAN 1: AWAKE (SIDEWAY, READING)
ANIMAL 1: AWAKE (FACE-ON)

HUMAN: NONE
ANIMAL 1: AWAKE (FACE-ON)

ANIMAL 1: AWAKE (SIDEWAY, EATING)

HUMAN: NONE
ANIMAL 1: AWAKE (LYING)
ANIMAL 2: AWAKE (SIDEWAY, WALKING)

HUMAN: NONE
ANIMAL 1: SLEEPING (LYING)

HUMAN: NONE
ANIMAL: NONE

| LOG | TIME | HUMAN | | ANIMAL | | EXAMPLE OF STATE |
|---|---|---|---|---|---|---|
| | | 1 | 2 | 1 | 2 | |
| 1 | 11:00 | AWAKE, FACE-ON | AWAKE, FACE-ON | ABSENT | ABSENT | |
| 2 | 11:15 | AWAKE, FACE-ON | AWAKE, FACE-ON | AWAKE, WALKING | ABSENT | |
| 3 | 11:30 | AWAKE, SIDEWAY, READING | ABSENT | AWAKE, FACE-ON | ABSENT | a |
| 4 | 11:45 | ABSENT | ABSENT | AWAKE, FACE-ON | ABSENT | b |
| 5 | 12:00 | ABSENT | ABSENT | AWAKE, EATING | ABSENT | c |
| 6 | 12:15 | ABSENT | ABSENT | AWAKE, LYING | AWAKE, WALKING | d |
| 7 | 12:30 | ABSENT | ABSENT | SLEEPING, LYING | SLEEPING, LYING | |
| 8 | 12:45 | ABSENT | ABSENT | SLEEPING, LYING | ABSENT | e |
| 9 | 13:00 | ABSENT | ABSENT | ABSENT | ABSENT | f |
| ... | ... | ... | ... | ... | ... | |

| HUMAN | ANIMAL | OUTPUT (TV SET) |
| --- | --- | --- |
| ABSENT/SLEEPING | ABSENT/SLEEPING | POWER SUPPLY OFF (STANDBY MODE) |
| AWAKE | AWAKE | COMMON CONTENT REPRODUCTION |
| AWAKE | ABSENT/SLEEPING | HUMAN CONTENT REPRODUCTION |
| ABSENT/SLEEPING | AWAKE | ANIMAL CONTENT REPRODUCTION |

| CONTENT TYPE | CID | CONTENT NAME | PURPOSE AND EFFECT | SOURCE | OUTPUT ADJUSTMENT |
|---|---|---|---|---|---|
| ANIMAL | C11 | ACTIVE DOGGY | CURIOSITY, EDUCATION | DEDICATED VIDEO | DOG |
| | C12 | BOW-WOW EXERCISE | PHYSICAL EXERCISE | DEDICATED VIDEO | DOG |
| | C13 | WORLD TRAVEL | RELAXATION | DEDICATED VIDEO | DOG |
| | C14 | HEALING PARADISE | RELAXATION | DEDICATED VIDEO | DOG |
| | C15 | GOOD NIGHT DOGGY | SLEEP INDUCING | DEDICATED VIDEO | DOG |
| | C16 | MISCHIEVOUS DOGGY! | APPETITE STIMULATION | DEDICATED VIDEO | DOG |
| | C17 | KITTY WORLD | CURIOSITY | DEDICATED VIDEO | CAT |
| | C18 | PET ALBUM | COMMUNICATION | PHOTOGRAPH | DOG |
| HUMAN | C21 | (LAST CHANNEL) | INFORMATION COLLECTION | TV | HUMAN |
| | C22 | PET OWNER'S PICTORIAL BOOK | OWNER EDUCATION | DEDICATED VIDEO | HUMAN |
| COMMON | C31 | LET'S PLAY WITH PET! | COMMUNICATION | DEDICATED VIDEO | HUMAN |
| | C32 | PET ALBUM | COMMUNICATION | PHOTOGRAPH | HUMAN |

| | AUDIO FREQUENCY | REFRESH RATE | COLOR TONE COMPENSATION |
|---|---|---|---|
| DOG | 40 Hz – 47 kHz | 120 Hz | COMPENSATE MAINLY WITH BLUE AND YELLOW |
| CAT | 60 Hz – 65 kHz | 75 Hz | COMPENSATE MAINLY WITH BLUE AND GREEN |
| HUMAN | 20 Hz – 20 kHz | 60 Hz | (STANDARD) |

| SID | TIME | TARGET ACTIVITY | REPRODUCTION CONTENT (CID) |
|---|---|---|---|
| 1 | 11:00 | WAKE UP | C11 |
| 2 | 11:15 | WAKE UP | |
| 3 | 11:30 | WAKE UP | |
| 4 | 11:45 | EXERCISE | C12 |
| 5 | 12:00 | EATING | C16 |
| 6 | 12:15 | SLEEP INDUCING | C15 |
| 7 | 12:30 | SLEEPING | C14 |
| 8 | 12:45 | SLEEPING | (NO SCREEN DISPLAY) |
| 9 | 13:00 | WAKE UP | C11 |
| ••• | ••• | ••• | ••• |

| HUMAN | ANIMAL | OUTPUT | |
|---|---|---|---|
| | | AIR CONDITIONER/AIR CLEANER/HUMIDIFIER•DEHUMIDIFIER | ILLUMINATION |
| ABSENT/SLEEPING | ABSENT/SLEEPING | ABSENT: POWER SUPPLY OFF (STANDBY MODE)<br>SLEEPING: SLEEP MODE | ABSENT: LIGHT OFF<br>SLEEPING: DIMMING (LOWER) |
| AWAKE | AWAKE | COMMON OPERATIONAL MODE | LIGHT ON (FOR HUMAN) |
| AWAKE | ABSENT/SLEEPING | HUMAN COMFORTABLE MODE | LIGHT ON (FOR HUMAN) |
| ABSENT/SLEEPING | AWAKE | ANIMAL COMFORTABLE MODE | LIGHT ON (FOR ANIMAL) |

| | | AIR CONDITIONER | AIR CLEANER | HUMIDIFIER•DEHUMIDIFIER | ILLUMINATION |
|---|---|---|---|---|---|
| ANIMAL | DOG | 23-25 °C | DEODORIZATION + AROMA EFFECT (DOG) | 40-60 % | COMPENSATE MAINLY WITH BLUE AND YELLOW |
| | CAT | 27 °C | DEODORIZATION + AROMA EFFECT (CAT) | 50-60 % | COMPENSATE MAINLY WITH BLUE AND GREEN |
| HUMAN | | SUMMER: 25-27 °C<br>WINTER: 10-20 °C | ECO-FRIENDLY | SUMMER: 50-60 %<br>WINTER: 40-50 % | (STANDARD) |
| COMMON | | 25°C | DEODORIZATION + ECO-FRIENDLY | 55 % | COMPENSATE MAINLY WITH BLUE |

DEVICE CONTROL METHOD FOR ESTIMATING A STATE OF AN ANIMAL AND FOR DETERMINING A CONTROL DETAIL FOR AN ELECTRONIC DEVICE

BACKGROUND

1. Technical Field

The present disclosure relates to an electronic device, an electronic device system, and a device control method that achieve relief of stress of an animal such as a dog that stays home alone and a comfortable life space where a human and an animal coexist.

2. Description of the Related Art

There have been electronic devices that change their operation according to an activity of an animal. Japanese Unexamined Patent Application Publication No. 2006-338476 discloses a technique that obtains voice of a baby or an animal and determines its emotion, and controls power ON/OFF, sound volume, and temperature setting of household electrical appliances according to the emotion and indoor environment. Japanese Unexamined Patent Application Publication No. 2005-202653 discloses a technique that identifies a human from an image and controls a device according to a state of the identified human.

SUMMARY

In one general aspect, the techniques disclosed here feature an electronic device according to the present disclosure including: a living thing state estimator that determines whether or not at least an animal other than a human is present in a space based on information on the space in which the electronic device is disposed, and estimates a state of the animal that is determined to be present, the information being detected by a detector; and a control detail determiner that determines a control detail for the electronic device, according to a result of the determination or the estimated state of the animal.

It should be noted that general or specific embodiments may be implemented as a system, a method, an integrated circuit, a computer program, a storage medium, or any selective combination thereof.

One non-limiting and exemplary embodiment provides the most suitable environment for a human and an animal in a space where both may be present according to the current situation.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a diagram illustrating an example of a table that indicates results of estimated activity state in the first embodiment;

FIG. 9 is a diagram illustrating an example of a table for control detail determination in the first embodiment;

FIG. 10 is a diagram illustrating an example of a table that manages content to be outputted in the first embodiment;

FIG. 11 is a diagram illustrating an example of a table that manages an output method in the first embodiment;

FIG. 12 is a diagram illustrating an example of a table that manages predetermined target activities in the first embodiment;

FIG. 16 is a diagram illustrating an example of a table for control detail determination in the second embodiment;

FIG. 17 is a diagram illustrating an example of a table that determines an operational mode of each of the electronic devices in the second embodiment;

DETAILED DESCRIPTION

Figure 1A:
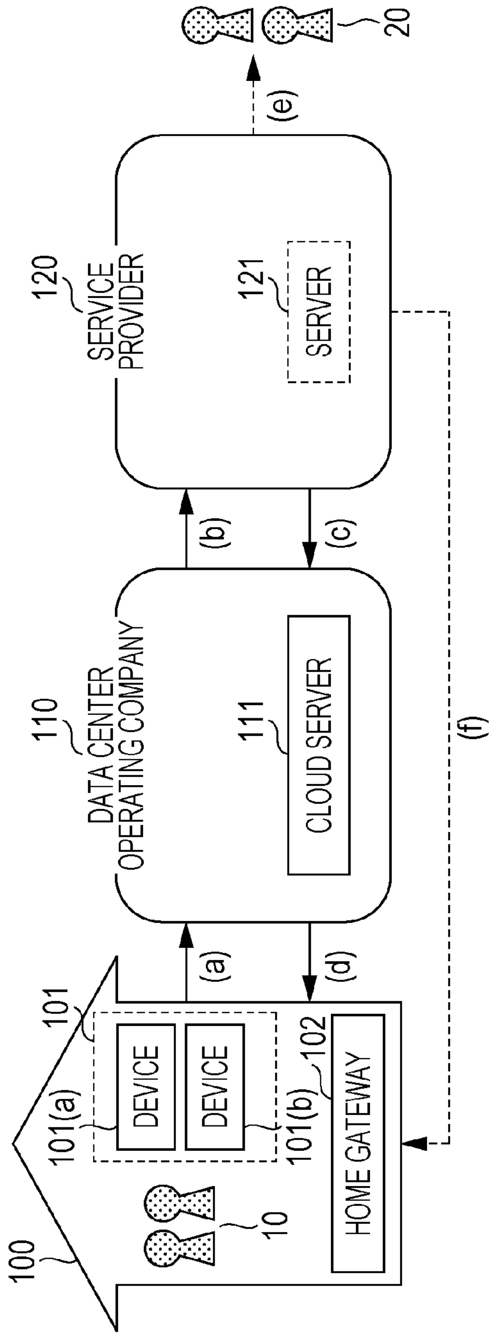
FIG. 1A is a diagram illustrating an overview of a service.

First, the matter discussed when embodiments according to the present disclosure were devised by the inventors will be described.

(Underlying Knowledge Forming Basis of the Present Disclosure)

An electronic device and accompanying service are being studied, in which information is obtained from all devices in houses or facilities for business use, the obtained information is analyzed, and is fed back to a human directly or indirectly. However, for owners who keep an animal as a family member like a human and engaged workers of business operator that manages the living bodies of animals, there is a need to reduce stress of the animals as much as possible and to achieve a comfortable life space for people and animal. There has been a problem in that a technical solution for satisfying the need has not been studied sufficiently.

That is, in a conventional electronic device that changes its operation according to an activity of an animal, the rate of recognition in estimation of various emotions of animals via sound has to be improved, and furthermore, ON/OFF of power supply, sound volume, and temperature setting, which are original functions of household electrical appliances, are only controlled, and control of content for animals according to a state or an activity of an animal has not been disclosed. Also, in a practical living space, hours in which both a human and an animal spend time together and hours in which only an animal stays at home coexist, and thus there has been a problem in that conventional simple control of an electronic device according to a state of a human or the like identified from an image does not achieve control for a comfortable life space according to the presence of a human and/or an animal.

(1) An aspect of the present disclosure provides an electronic device including:

a living thing state estimator that determines whether or not at least an animal other than a human is present in a space in which the electronic device is disposed, based on information on the space, and estimates a state of the animal that is determined to be present, the information being detected by a detector; and a control detail determiner that determines a control detail for the electronic device, according to a result of the determination or the estimated state of the animal.

(2) The electronic device includes an outputter that performs a predetermined operation. As long as the state of the animal is estimated to be an awake state by the living thing state estimator or when a change in the state of the animal from a sleeping state to the awake state is estimated by the living thing state estimator, the control detail determiner causes the outputter to perform an operation, as the predetermined operation, which is indicated by a control detail corresponding to the awake state.

(3) As long as the state of the animal is estimated to be a sleeping state by the living thing state estimator, the control detail determiner causes the outputter to perform an operation, as the predetermined operation, which is indicated by a control detail corresponding to the sleeping state, or when a change in the state of the animal from the awake state to the sleeping state is estimated by the living thing state estimator, the control detail determiner causes the outputter to stop the operation which is indicated by the control detail corresponding to the awake state.

(4) The predetermined operation includes an operation of reproducing a video and an operation of reproducing sound, the operation indicated by the control detail corresponding to the awake state of the animal is an operation of causing the outputter to reproduce a video or sound corresponding to the awake state, and the operation indicated by the control detail corresponding to the sleeping state of the animal is an operation of causing the outputter to reproduce a video or sound corresponding to the sleeping state.

(5) The predetermined operation includes an operation of adjusting an optical output of illumination, the operation indicated by the control detail corresponding to the awake state of the animal is an operation of causing the outputter to adjust an optical output of illumination corresponding to the awake state, and the operation indicated by the control detail corresponding to the sleeping state of the animal is an operation of causing the outputter to adjust an optical output of illumination corresponding to the sleeping state.

(6) The predetermined operation includes an operation of air cleaning to remove a smell and an operation of generating a scent, the operation indicated by the control detail corresponding to the awake state of the animal is an operation of causing the outputter to perform air cleaning to remove a smell, corresponding to the awake state or an operation of causing the outputter to perform scent generation corresponding to the awake state, and the operation indicated by the control detail corresponding to the sleeping state of the animal is an operation of causing the outputter to perform air cleaning to remove a smell, corresponding to the sleeping state or an operation of causing the outputter to perform scent generation corresponding to the sleeping state.

(7) The information on the space detected by the detector is an image of the space captured by an image capture device provided in the electronic device or an external image capture device connected to the electronic device, the living thing state estimator determines the presence of an animal other than a human in the space by analyzing the image captured by the image capture device, and the living thing state estimator further estimates whether or not the state of the animal is the awake state by analyzing a change in a plurality of images with different image capturing times.

(8) The information on the space detected by the detector is sensor data in the space detected by a sensor unit provided in the electronic device or an external sensor unit connected to the electronic device, the living thing state estimator determines the presence of an animal other than a human in the space by analyzing the sensor data detected by the sensor unit, and the living thing state estimator further estimates whether or not the state of the animal is the awake state by analyzing a change in a plurality of pieces of the sensor data with different acquisition times.

(9) The living thing state estimator further determines whether or not a human is present and whether or not an animal other than a human is present in the space based on the information on the space in which the electronic device is disposed, and estimates a state of the human or the animal that is determined to be present, and the control detail determiner changes the control detail of the electronic device according to a result of the determination or the estimated state of the human or the animal.

(10) When the living thing state estimator determines one of (1) a state in which a human and an animal are present, (2) a state in which only an animal is present and no human is present, (3) a state in which only a human is present and no animal is present, and (4) a state in which neither a human nor an animal is present, the control detail determiner changes the control detail for the electronic device according to the determined state.

(11) The electronic device further includes an outputter that reproduces a video or sound, and when the living thing state estimator determines the state in which no human is present and only an animal is present and as long as the animal is estimated to be in an awake state, the control detail determiner causes the outputter to reproduce a video or sound which is indicated by a control detail according to the estimated state of the animal.

(12) When the living thing state estimator determines the state in which no human is present and only an animal is present and as long as the animal is estimated to be in the awake state, the control detail determiner of the electronic device causes the outputter to reproduce a video or sound which is indicated by a control detail according to the estimated state of the animal, and when the determination by the living thing state estimator is changed from the state in which the animal is present and no human is present to a state in which the animal and human are present or when the estimation on the state of the animal by the living thing state estimator is changed from the awake state to the sleeping state, the control detail determiner causes the outputter to stop reproduction of the video or the sound, or causes the outputter to reproduce a video or sound which is indicated by a control detail according to the changed state of the animal.

(13) A video to be reproduced by the outputter of the electronic device is reproduced with a refresh rate of a video which is visually recognizable by the animal, and sound to be reproduced by the outputter of the electronic device is reproduced with adjusted audio frequencies audible by the animal.

(14) The control detail determiner of the electronic device includes a scheduler that manages an order of a plurality of control details to be outputted to the outputter in a time sequence, the scheduler holds a table that specifies target activities intended to be directed to the animal, a time at which each of the target activities is directed, and a control detail according to each target activity, and the scheduler causes the electronic device to reproduce a video or sound indicated by the control detail according to each target activity at a time at which the target activity is directed.

(15) A state of the human is a state of a user who is an owner of the animal, the electronic device further includes a living thing state storage database that stores temporal transition of the state of the animal and temporal transition of the state of the user, and the living thing state estimator learns a life pattern of the animal or a life pattern of the user from the temporal transition of the state of the animal and the temporal transition of the state of the user that are stored in the living thing state storage database, and predicts a transition of the state of the animal or a transition of the state of the user from the learned life pattern of the animal or life pattern of the user.

(16) The control detail determiner of the electronic device includes a preference tendency database including general preference tendency of control detail according to a type of animal, and the control detail determiner selects a candidate for the control detail based on the preference tendency database, and further learns records related to reactions of the animal to previous control detail and adjusts determination on the control detail, the records being registered in the preference tendency database.

(17) A predetermined video or sound outputted by the outputter of the electronic device is a content programmed for forming a life pattern of the animal, and is a video or sound including timing for feeding food, an amount of food, a method of feeding, a target weight and change in weight, and advice information for life of the animal, or is an icon or an advertisement space which is displayed on a screen to prompt for reproduction of the video or sound.

(18) At least one of the living thing state estimator and control detail determiner includes a processor.

(19) Another aspect of the present disclosure provides an electronic device system including:

an information transmitter and receiver that transmits and receives information via a network to and from a first electronic device and a second electronic device installed in a predetermined space;

a living thing state estimator that determines whether or not at least an animal other than a human is present based on information on the predetermined space, and estimates a state of the animal that is determined to be present, the information being detected by a detector included in the first electronic device and being received by the information transmitter and receiver; and a control detail determiner that determines a control detail for the second electronic device, according to a result of the determination or the estimated state of the animal, wherein the information transmitter and receiver transmits information to the second electronic device via the network, the information for performing an operation indicated by the determined control detail.

(20) The second electronic device is an air cleaner, and the control detail is further associated with a characteristic of the animal, in the case where the characteristic of the animal is that the animal is sensitive to pollution in air, when the living thing state estimator determines that the animal is present, the control detail determiner selects a control detail that indicates an operation for causing the air cleaner to perform air cleaning with high frequency, in the case where the characteristic of the animal is that the animal does not like change of environment, when the living thing state estimator determines that the animal is not present, the control detail determiner selects a control detail that indicates an operation for causing the air cleaner to perform air cleaning, In the case where the characteristic of the animal is that the animal is sensitive to stress, when the living thing state estimator determines that the animal is present, the control detail determiner selects a control detail that indicates an operation for causing the air cleaner to generate aroma scent that reduces stress, in the case where the characteristic of the animal is that the animal is sensitive to dryness or moisture, when the living thing state estimator determines that the animal is present, the control detail determiner selects a control detail that indicates an operation for causing the air cleaner to humidify or dehumidify air so as to achieve a temperature or a humidity associated with the animal or a predetermined temperature or humidity.

(21) The second electronic device is a first illumination device installed in the predetermined space, and an operation indicated by a control detail according to a state in which the animal is sleeping specifies an instruction to cause the first illumination device to reduce an illumination intensity of the first illumination device or to increase an illumination intensity stepwise during a time period in which the animal is scheduled to be woken up.

(22) The second electronic device is a first illumination device installed in the predetermined space, and the network is further connected to a second illumination device installed in a target space to which the animal is intended to be moved, an operation indicated by a control detail according to a state in which the animal is awake specifies an instruction to cause the first illumination device to reduce an illumination intensity of the first illumination device installed in the predetermined space for moving the animal to the target space and to cause the first illumination device to increase an illumination intensity of the second illumination device installed in the target space.

(23) The second electronic device is a first illumination device installed in the predetermined space, and an operation indicated by a control detail according to a state in which the animal is awake or a state in which the animal is sleeping specifies an instruction to cause the first illumination device to perform at least one of:

an operation to change a color of illumination light of the first illumination device to a color that reduces stress of the animal, an operation to change an intensity of illumination light of the first illumination device to an intensity that reduces stress of the animal, and an operation to change a frequency of light source of illumination light of the first illumination device to a frequency of light source that reduces stress of the animal.

(24) Still another aspect of the present disclosure provides a device control method for a server device that is connected to one or more electronic devices in a house via a network and that controls the one or more electronic devices, the device control method comprising:

receiving information on a predetermined space from a first electronic device that is disposed in the predetermined space, the information being detected by the first electronic device;

determining whether or not at least an animal other than a human is present in the space when the information on the predetermined space is received, and estimating a state of the animal that is determined to be present; and determining a control detail for a second electronic device disposed in the space, according to a result of the determination or the estimated state of the animal.

(25) The information on the space is an image or sensor data of the predetermined space, the information being obtained by the first electronic device, in the receiving, the images or pieces of sensor data, which are detected by the detector of the first electronic device at different times, are received from the first electronic device, and in the estimating, the received images or pieces of sensor data are analyzed, and a state of the animal is thereby estimated.

(26) The device control method further comprising storing pieces of information on the space in relation to distinct times, the pieces of information being received in the receiving, wherein in the estimating, whether or not an animal is present in the space is determined based on the information on the space, obtained by the first electronic device, and when it is determined that an animal is present in the space, a state of the animal is estimated using the pieces of information on the space with the distinct times.

It is to be noted that each of the embodiments described below illustrates a specific example of the present disclosure. The numerical values, shapes, components, steps, and the order of the steps shown in the following embodiments each provide an example, and are not intended to limit the present disclosure. In addition, any component which is included in the components of the following embodiments and which is not recited in the independent claim that provides the most generic concept will be described as an arbitrary component. In each of all embodiments, any configurations of the embodiments may be combined.

In the following embodiments, the meaning of each of the words below is defined as follows unless otherwise indicated.

"Living thing" refers to and includes humans and animals.

"Animal" refers to an animal other than humans (humans are not included).

"Human" refers to a human (any animal other than humans is not included).

Also, the terms "device" and "electronic device" which are written in the following description have substantially the same meaning.

(Overview of Provided Service)

FIG. 1A illustrates an overview of an electronic device and an electronic device system in the present embodiment.

A group 100 is, for instance, a company, an organization, or a house, and its size does not matter. The group 100 has a device 101(*a*) and a device 101(*b*) included in devices 101, and a home gateway 102. The devices 101 includes a device connectable to the Internet (for instance, a smart phone, a PC, and a TV set), as well as a device unconnectable to the Internet itself (for instance, an illumination light, a washing machine, and a refrigerator). A device connectable to the Internet via the home gateway 102 may be provided even when the device itself is unconnectable to the Internet. The group 100 also includes users 10 who use the devices 101. Although it has been stated above that the devices 101 includes the device 101(*a*) and the device 101(*b*), the configuration is not limited to this. A great number of devices may be provided in the group 100 and the number of devices included in the devices 101 is not particularly limited. In the following embodiments, the device 101(*a*) to device 101(*g*) are mentioned and all of these are included in the devices 101 illustrated in FIG. 1A.

Figure 1B:
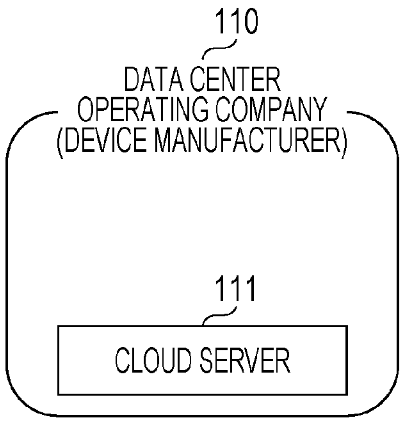
FIG. 1B is a diagram illustrating an overview of a service.
Figure 1C:
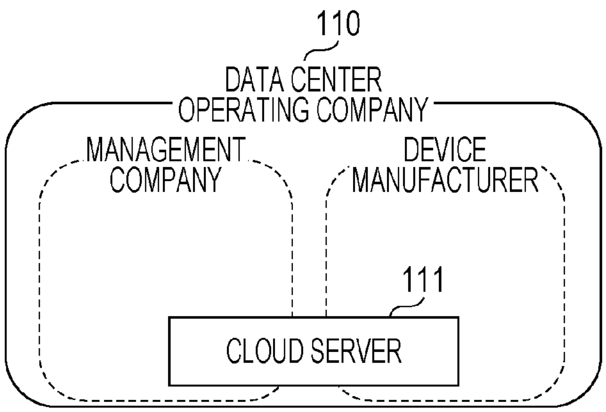
FIG. 1C is a diagram illustrating an overview of a service.

A data center operating company 110 has a cloud server 111. The cloud server 111 is a virtual server that cooperates with various devices via the Internet. Huge data (big data), which is difficult to be treated by a normal database management tool or the like, is mainly managed. The data center operating company 110 performs data management, management of the cloud server 111, and administers the data center that performs these management. The details of the services performed by the data center operating company 110 will be described later. Here, the data center operating company 110 is not limited to a company that performs only data management and administration of the cloud server 111. For instance, in the case where a device manufacturer that develops and manufactures one of the devices 101 also performs data management and management of the cloud server 111, the device manufacturer corresponds to the data center operating company 110 (FIG. 1B). In addition, the data center operating company 110 is not necessarily one company. For instance, in the case where a device manufacturer and another management company jointly or separately perform data management and/or administer the cloud server 111, both companies or one of the companies corresponds to the data center operating company 110 (FIG. 1C).

A service provider 120 has a server 121. The server 121 mentioned here has no size requirements and includes, for instance, the memory in a PC for personal use. Also, the service provider 120 may not have the server 121.

It is to be noted that the home gateway 102 is not indispensable in the above-described service. For instance, when the cloud server 111 performs all data management, the home gateway 102 is unnecessary. Also, as in the case where all devices in a house are connected to the Internet, there may be no device which is unconnectable to the Internet itself.

Next, the flow of information in the above-mentioned service will be described.

First, the device 101(*a*) or the device 101(*b*) in the group 100 transmits log information to the cloud server 111 of the data center operating company 110. The cloud server 111 accumulates the log information of the device 101(*a*) or the device 101(*b*) ((a) in FIG. 1A). Here, the log information is, for instance, information indicating operation conditions for and date and time of operation of the devices 101, and information on the state and environment of the periphery of the devices, obtained from cameras and/or sensors mounted on the devices. For instance, the log information includes an image around a TV set, captured by a camera (image capture device) mounted on the TV set, data on the heat radiated from a human and/or an animal around the devices, detected by a sensor mounted on a TV set or an air conditioner, TV set viewing history and recording reservation information of a recorder, operation date/time and an amount of washing by a washing machine, and date/time and frequency of opening and closing of a refrigerator. However, without being limited to these, the log information refers to all information obtainable from all of the devices. The log information may be directly provided by the devices 101 themselves to the cloud server 111 via the Internet. Alternatively, the log information may be once accumulated on the home gateway 102 from the devices 101 and provided to the cloud server 111 from the home gateway 102.

Next, the cloud server 111 of data center operating company 110 provides the accumulated log information to the service provider 120 in a certain unit. Here, the information accumulated by the data center operating company may be arranged in a unit which may be provided to the service provider 120 or which is requested by the service provider 120. The certain unit may not be a fixed unit and the amount of provided information may change according to a situation. The log information is stored in the server 121 as needed, which is held by the service provider 120 ((b) in FIG. 1A). The service provider 120 then arranges the log information to be suitable for a service provided to users and provides the information to the users. The users provided with the log information may be the users 10 who use the devices 101 or may be external users 20. A method of service provision to users may be such that a service is directly provided to users from the service provider 120, for instance ((f), (e) in FIG. 1A). Alternatively, a method of service provision to users may be such that a service is provided to users via the cloud server 111 of the data center operating company 110 again ((c), (d) in FIG. 1A). Also, the cloud server 111 of the data center operating company 110 may arrange the log information to be suitable for a service provided to users and may provide the information to the users.

It is to be noted that the users 10 and the users 20 may be different or the same.

First Embodiment

An electronic device in the present embodiment includes: a living thing state estimator that determines whether or not at least an animal other than a human is present in a space based on information on the space in which the electronic device is disposed, and estimates a state of the animal that is determined to be present, the information being detected by a detector; and a control detail determiner that determines a control detail for the electronic device, according to a result of the determination or the estimated state of the animal. Hereinafter, the configuration of devices and the operation of devices will be described.

[Configuration of Devices]

The configuration of the device 101(*a*) in the present embodiment will be described with reference to FIG. 2A and FIG. 2B. It is to be noted that although description is given by taking a TV set as an example of the device 101(*a*) in the present embodiment, the disclosure is not limited to this.

Figure 2A:
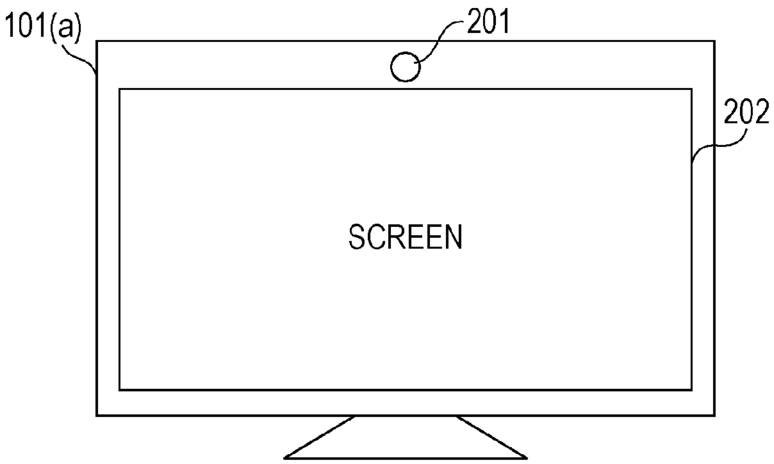
FIG. 2A is a diagram illustrating an example of an outline of an electronic device in a first embodiment.
Figure 2B:
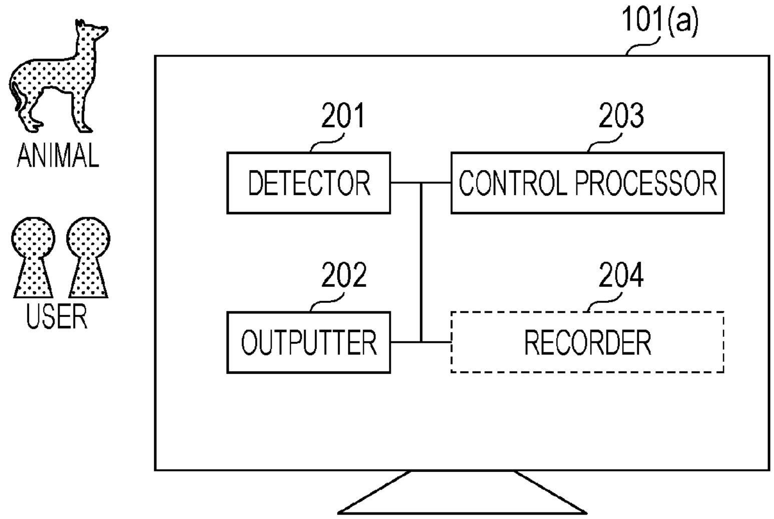
FIG. 2B is a diagram illustrating an example of a configuration of the electronic device in the first embodiment.

FIG. 2A is a diagram illustrating an example of the outline of the device 101(*a*). In addition, FIG. 2B is a diagram illustrating an example of a configuration of the device 101(*a*). The device 101(*a*) includes a detector 201, an outputter 202, a control processor 203, and a recorder 204.

As illustrated in FIG. 2A, the detector 201 is disposed on part (an upper portion) of the device 101(*a*). The detector 201 obtains, for instance, information on a space in which the device 101(*a*) is disposed. More specifically, the detector 201 is a camera or a sensor that detects a two-dimensional visible image. Alternatively, the detector 201 may be a camera or a sensor that detects a two-dimensional infrared image (thermal image). The detector 201 detects a two-dimensional image (such as a visible image, a thermal image) in the front direction of the device 101(*a*), and outputs the detected two-dimensional image to the control processor 203 described later.

It is to be noted that the detector 210 may not necessarily detect a two-dimensional image. The detector 210 may be a sensor that detects only the presence or absence of an object.

In addition, the detector 210 does not have to include the device 101(*a*). For instance, the detector 210 may be separated from the device 101(*a*). In this case, a configuration may be adopted in which the detector 210 is connected to the device 101(*a*) and information on a space obtained by the detector 210 is outputted to the device 101(*a*). The connection between the detector 210 and the device 101(*a*) may be a wired connection or may be a wireless connection.

As illustrated in FIG. 2A, the outputter 202 includes, for instance, a liquid crystal panel which is disposed at the front of the device 101(*a*), and outputs and displays information (for instance, an image and a video, sound) to a user or an animal, the information being outputted from the later-described control processor 203.

As a hardware configuration, for instance, the control processor 203 includes a circuit such as a central processing unit (CPU) or a microcomputer provided internally of the device 101(*a*). The device 101(*a*) may also include a memory which is not illustrated. The memory, which is not illustrated, stores a program for operating the control processor 203, for instance. For instance, a configuration may be adopted in which the control processor 203 functions by executing a program by the CPU included in the device 101(*a*), the program being recorded in the memory.

Alternatively, the control processor 203 may be formed using a circuit such as a microcomputer in which the functions of the control processor 203 are incorporated.

The control processor 203 obtains information from the detector 201, the outputter 202, or the later-described recorder 204, and performs processing (determination) based on the obtained information. Furthermore, the control processor 203 outputs information to the detector 201, the outputter 202, or the recorder 204, and controls each component.

When the device 101(*a*) is a TV set, the outputter 202 has a function of reproducing, for instance, an image such as a still image or a video and a function of reproducing sound.

For instance, a program for achieving the function of the outputter 202 is stored in the memory. For instance, the CPU included in the device 101(*a*) executes the program recorded in the memory. Accordingly, the function of the outputter 202 is achieved.

Alternatively, the outputter 202 may be formed by incorporating the function thereof in a microcomputer.

For instance, when the device 101(*a*) is a TV set, a program for achieving the function of reproducing an image and the function of reproducing sound is stored in the memory. The CPU included in the device 101(*a*) executes the program recorded in the memory. Thus, a configuration may be adopted in which an image and sound are reproduced in the outputter 202.

Alternatively, a function of reproducing an image and a function of reproducing sound may be incorporated in a microcomputer to achieve the function of reproducing an image and the function of reproducing sound in the outputter 202.

A reproduced image is displayed, for instance, on a liquid crystal panel included in the outputter 202. Also, a reproduced sound is outputted from, for instance, a speaker included in the outputter 202.

Figure 3A:
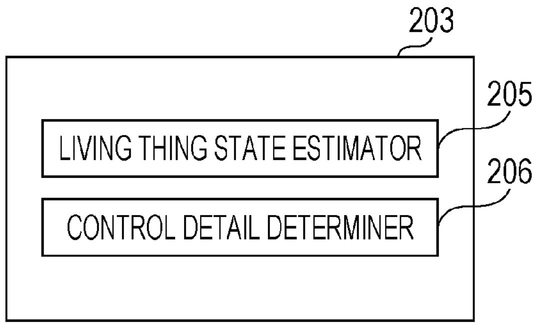
FIG. 3A is a diagram illustrating an example of a functional configuration of a control processor in the first embodiment.

FIG. 3A is a diagram illustrating an example of a detailed functional configuration of the control processor 203. The control processor 203 includes, for instance, a living thing state estimator 205 corresponding to the living thing state estimator, and a control detail determiner 206 corresponding to the control detail determiner. The processing of each functional configuration will be described later. It is to be noted that part of the functions (for instance, a function of performing part or all of the processing of the living thing state estimator 205) of the control processor 203 may be included in the detector 201 (for instance, a camera or a sensor).

The recorder 204 is, for instance, a rewritable recording medium such as a memory, a hard disk that is provided internally of the device 101(*a*). The recorder 204 temporarily records or stores information outputted from each component and information obtained externally of the device 101(*a*).

Figure 3B:
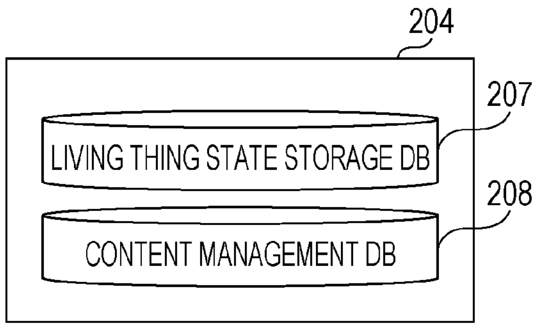
FIG. 3B is a diagram illustrating an example of a functional configuration of a recorder in the first embodiment.

FIG. 3B is a diagram illustrating an example of a detailed functional configuration of the recorder 204. The recorder 204 includes a living thing state storage database (DB) 207 and a content management database (DB) 208. The feature of each functional configuration will be described later.

It is to be noted that the recorder 204 is not an indispensable component in the present embodiment. An external device other than the device 101(*a*) may include the recorder 204 (the living thing state storage DB 207, the content management DB 208), and the device 101(*a*) and the external device may exchange information by a wire or wirelessly instead.

Although each of the components has been described with reference to FIG. 2A and FIG. 2B in the above, and the device 101(*a*) does not have to include all these components. An external device may include part of the components and may exchange information with the device 101(*a*) instead. Also, the device 101(*a*) may include a component other than the above-described components.

[Flow of Operation and Processing of Device]

Figure 4:
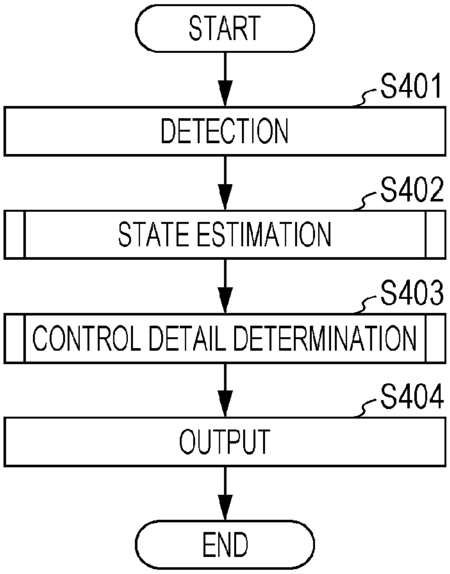
FIG. 4 is a flow chart illustrating an example of an operation of the device in the first embodiment.

FIG. 4 is a flow chart illustrating an example of the operation of the device 101(*a*) in the present embodiment.

First, in step S401, the detector 201 detects a two-dimensional image (such as a visible image, a thermal image) in the front direction of the device 101(*a*), and outputs the detected two-dimensional image to the control processor 203. Here, the timing and frequency of detection are not particularly limited.

For instance, the detector 201 may detect a two-dimensional image for every predetermined time interval such as 5 minutes or 10 minutes.

For instance, when the presence of a human or an animal is detected by the control processor 203, the control processor 203 may instruct the detector 201 to perform detection with a time interval shorter than the above-mentioned predetermined time so as to increase detection frequency.

It is to be noted that information obtained by the detector 201 may not necessarily information on a two-dimensional image, and for instance, may be sensing information in the space, obtained by a sensor.

Figure 5:
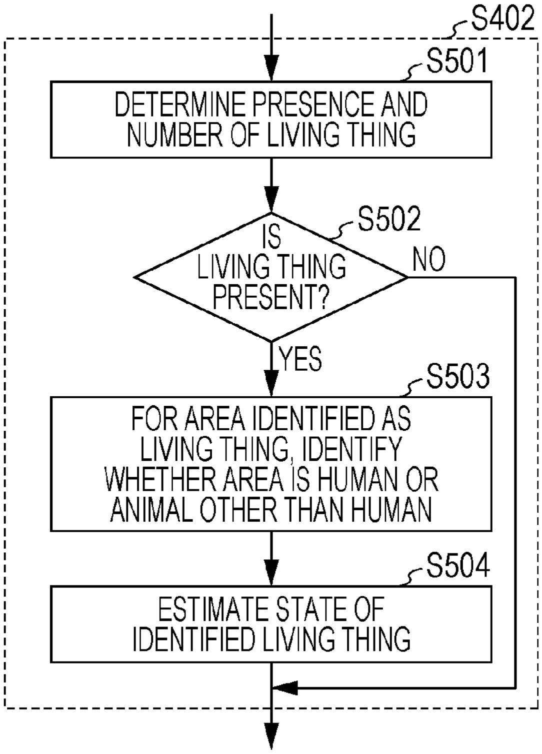
FIG. 5 is a flow chart illustrating an example of processing of state estimation in the first embodiment.

Next, in step S402, the control processor 203 estimates a state of space based on the information (such as a two-dimensional image, sensing information) outputted from the detector 201 in step S401. FIG. 5 is a flow chart illustrating an example of detailed processing of state estimation in step S402.

First, in step S501, the living thing state estimator 205 of the control processor 203 analyzes the information (such as a two-dimensional image, sensing information) outputted from the detector 201 to determine the presence or absence of a living thing and the number of living things.

A method of determining the presence or absence of a living thing and the number of living things is not particularly limited. For instance, it may be determined whether or not a living thing is present based on a change (difference) between images with different acquisition times. For instance, when the detector 201 is configured to capture a two-dimensional image, the acquisition time corresponds to the time when the two-dimensional image is captured. For instance, when the detector 201 is configured to obtain sensor information from a sensor, the acquisition time corresponds to the time when the sensor information is obtained.

The change (difference) between two-dimensional images with different acquisition times, obtained by the detector 201 indicates a pixel area (difference area) in which the brightness value has changed within a predetermined time by a predetermined threshold value or greater, for instance, between two-dimensional images.

It may be estimated that the difference area is an area in which motion occurs in an image. In this manner, detection of a difference between two-dimensional images with different times enables the presence of a living thing to be identified, the living thing having a motion of a human or an animal in a space. Also, it is possible to identify the number of living things by measuring the number of areas in which a difference between two-dimensional images is detected. For instance, when the two-dimensional images are each a visible image, another method of determining the presence or absence of a living thing may be to identify the area of a living thing based on color information and characteristic of brightness, and characteristic of shape in the visible image. Also, when the two-dimensional image are each a thermal image, the area of a living thing may be identified based on the information on temperature in the thermal image.

Next, in step S502, based on a result of the determination in step S501, the living thing state estimator 205 determines whether or not a living thing is present in the space for which an image is obtained, and subsequent processing is branched. When a living thing is present in step S502, the flow proceeds to processing in step S503. On the other hand, when a living thing is absent, the processing in step S402 is exited, and the living thing state estimator 205 outputs information to the control detail determiner 206, the information indicating that no living thing (a human and an animal) is present.

Next, in step S503, for the area which is identified as a living thing in the two-dimensional image, the living thing state estimator 205 identifies whether the area indicates a human or an animal other than humans. Here, a method of identifying a human or an animal other than humans is not particularly limited.

For instance, for the area identified as a living thing in the image in step S501, it may be determined whether the area indicates a human or an animal other than humans based on the size, the color, and the shape of the area. In this case, it is desirable that characteristics such as a size, a color, and a shape of a human or an animal in images be recorded in the recorder 204 in advance (at the time of shipment of the device 101(*a*)). For instance, the characteristics such as the size, the color, and the shape of the area identified as a living thing in step S501 are compared with the characteristics recorded in the recorder 204, and whether the area indicates a human or an animal other than humans may be determined based on a result of the comparison.

In the case where a human or an animal to be identified in step S503 by the living thing state estimator 205 is known in advance, the information on the characteristics of a human or an animal to be identified may be recorded in the recorder 204.

For instance, the characteristics of the users (humans) who use the device 101(*a*) and of animals are obtained in advance and stored in the recorder 204 (advanced registration/calibration), and are compared with the area identified as a living thing in the two-dimensional image and whether the area indicates a human or an animal other than humans may be determined. In this manner, accuracy of detection is improved.

Alternatively, for instance, the detector 201 may further have a sensor that measures the distance from the electronic device 101(*a*) to a human and/or an animal to be identified. In this case, based on information on the distance measured by the sensor, the living thing state estimator 205 is able to determine whether or not a human and/or an animal to be identified by the living thing state estimator 205 are present in the space in which the electronic device 101(*a*) is disposed or in the periphery of the electronic device 101(*a*).

Next, in step S504, the living thing state estimator 205 estimates a state of the human or the animal identified in step S503. Here, a method of estimating a state of the human or the animal is not particularly limited. A human or an animal, which is determined to be present for instance by analyzing a change between obtained images with different times, is estimated to be "awake" or "sleeping". In this case, the human or the animal is estimated to be "awake" when the temporal change is large, and is estimated to be "sleeping" when the temporal change is small. When the detector 201 is a sensor that obtains information (sensor information) other than a two-dimensional image, whether the human or the animal is "awake" or "sleeping" may be estimated based on the temporal change in the sensor information obtained by the sensor.

After the processing in step S504 or after processing result of "No" is determined in step S502, the processing in step S402 is completed and the flow proceeds to step S403.

Here, when determination of "Yes" is made in step S502 and the processing in step S504 is performed to complete the processing in step S402, the living thing state estimator 205 outputs to the control detail determiner 206, at least one of pieces of information on (i) the type of living thing present (such as only a human/only an animal other than humans/both human and animal), (ii) the number of living things (such as 1 human/2 animals/1 human and 1 animal), and (iii) the state (such as awake/sleeping) of living thing present.

When determination of "No" is made in step S502 and the processing in step S402 is completed, the living thing state estimator 205 outputs information indicating (iv) living thing (a human or an animal) is absent to the control detail determiner 206.

Figure 7A:
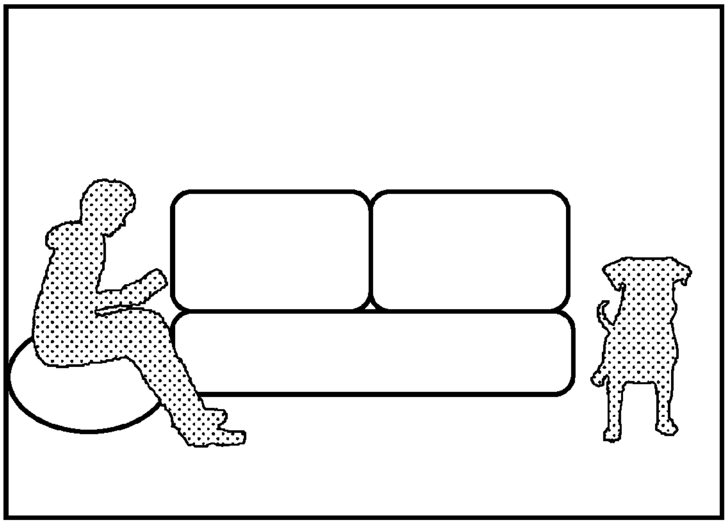
FIG. 7A is a diagram illustrating an example of a state in a space and information to be outputted in the first embodiment.
Figure 7B:
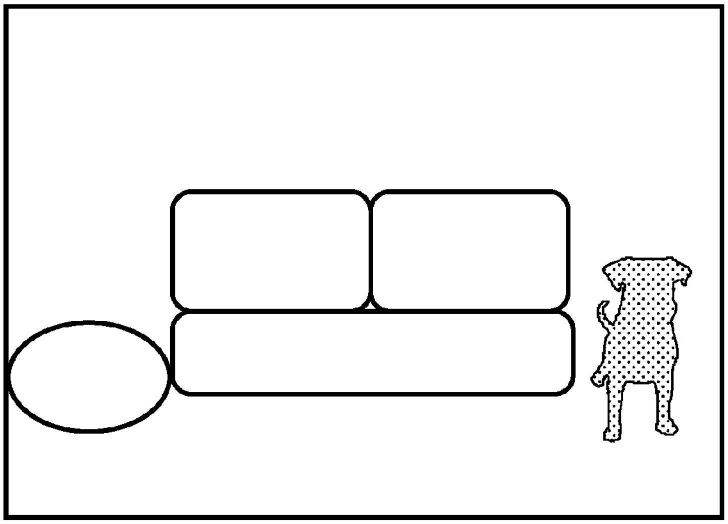
FIG. 7B is a diagram illustrating an example of a state in a space and information to be outputted in the first embodiment.
Figure 7C:
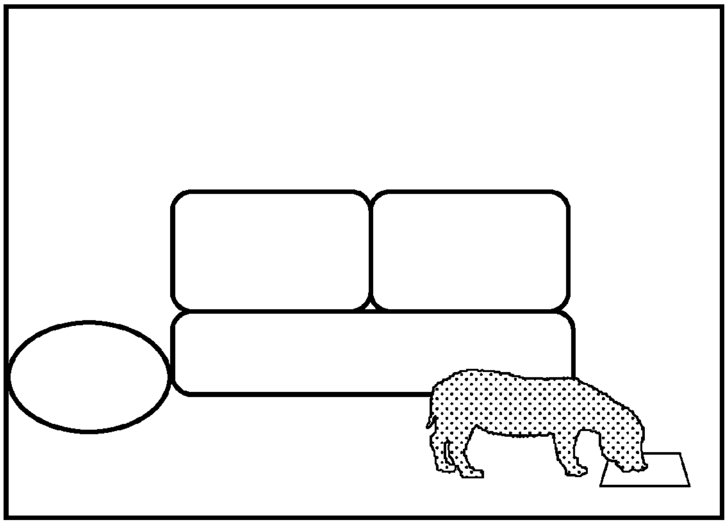
FIG. 7C is a diagram illustrating an example of a state in a space and information to be outputted in the first embodiment.
Figure 7D:
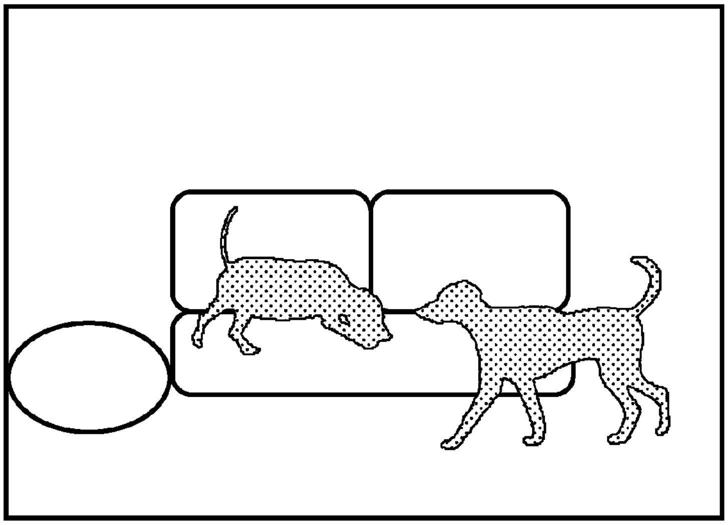
FIG. 7D is a diagram illustrating an example of a state in a space and information to be outputted in the first embodiment.
Figure 7E:
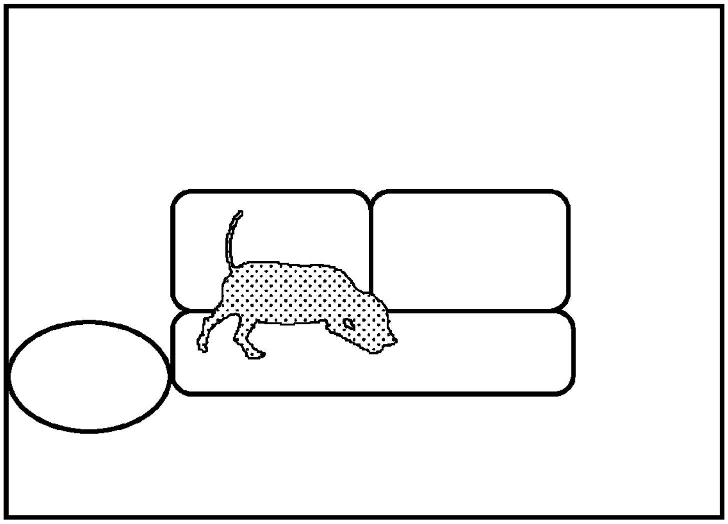
FIG. 7E is a diagram illustrating an example of a state in a space and information to be outputted in the first embodiment.
Figure 7F:
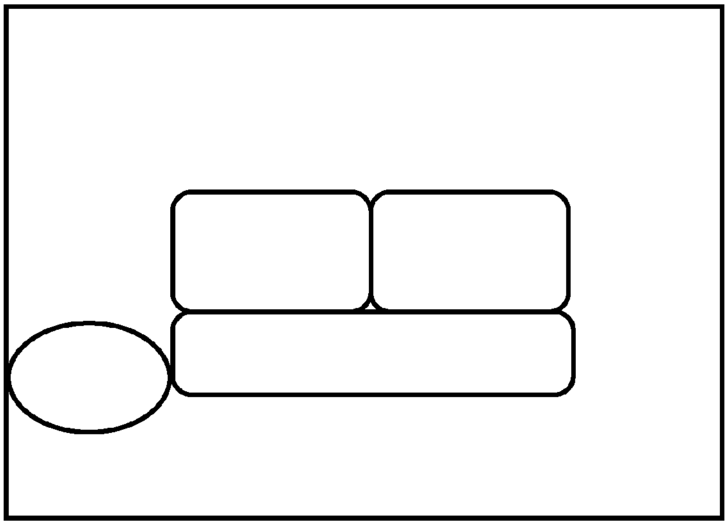
FIG. 7F is a diagram illustrating an example of a state in a space and information to be outputted in the first embodiment.

FIGS. 7A to 7F are each a diagram illustrating an example of a state in a space and information to be outputted to the control detail determiner 206, the state being estimated by the living thing state estimator 205 in step S501 to S504. FIG. 7A illustrates a state in which an awake human and an awake animal are present at the same time in a space. FIG. 7B and FIG. 7C illustrate a state in which only one awake animal is present in a space. FIG. 7D illustrates a state in which two awake animals are present in a space. FIG. 7E illustrates a state in which two sleeping animals are present in a space. FIG. 7F illustrates a state in which a living thing (a human or an animal) is absent in a space. The living thing state estimator 205 estimates one of these states and outputs information to the control detail determiner 206, the information being of (i) to (iv) described above.

It is to be noted that instead of or in addition to the states of "awake" and "sleeping", another state may be estimated in step S504.

For instance, in the case of FIGS. 7A to 7D, the living thing state estimator 205 also estimates the orientation (such as face-on, sideway) of a human or an animal with respect to the device 101(*a*). A known technique may be adopted as a method of estimating an orientation and the method is not particularly limited. For instance, the orientation of a living thing may be estimated by adopting a facial recognition technology and estimating the orientation of a face. The estimation of the orientation makes it possible to estimate whether or not the living thing faces in a direction to the device 101(*a*), that is, whether or not the living thing is interested in the device 101(*a*). Thus, in the below-described control detail determination by the control detail determiner 206, it is possible to determine a control which is the most suitable for a user (a human or an animal) and suited to a state of the user. Therefore, when an awake living thing is present, it is preferable to estimate the orientation of the living thing additionally.

Furthermore, for instance, as in FIG. 7A, FIG. 7C, and FIG. 7D, the activity (such as reading, eating, walking) of the living thing may be estimated. A known technique may be adopted as a method of estimating an activity and the method is not particularly limited. Calculation of a difference between two-dimensional images with different times makes it possible to determine whether the living thing is moving or still, and thus an activity such as reading or walking may be estimated. When the living thing is still at a predetermined location, whether the living thing is eating or reading may be estimated based on the location. Estimation of an activity leads to estimate whether or not the living thing is interested in the device 101(*a*).

In addition, the mental state (such as calm mental state, active mental state) of the living thing may also be estimated. Thus, in the below-described control detail determination by the control detail determiner 206, it is possible to determine a control which is the most suitable for a user (a human) or an animal and suited to a state of the user or the animal. Therefore, when an awake living thing is present, it is preferable to estimate the activity of the awake living thing additionally.

FIG. 8 is a diagram illustrating an example of a table 801 that manages the information outputted to the control detail determiner 206 by the living thing state estimator 205. These pieces of information may be stored in the table 801 as log information by the living thing state storage DB 207 of the recorder 204 or may be recorded temporarily and erased as needed.

When these pieces of information are stored in the table 801 as log information by the living thing state storage DB 207 of the recorder 204, temporal transition of the state of an animal and temporal transition of the state of a user who is the owner of the animal are stored.

The device 101(*a*) is able to learn the life patterns of an animal and a user in the space in which the device 101(*a*) is disposed, by analyzing the log information.

In the case where the user is absent in the space in which the device 101(*a*) is disposed at a frequency greater than a predetermined frequency when the animal in a sleeping state, the device 101(*a*) is able to learn that the user is not in the space in which the device 101(*a*) is disposed during a sleep time of the animal.

For instance, in the case where the animal changes a sleeping state 15 minutes after the animal is in an eating state at a frequency greater than a predetermined frequency, the device 101(*a*) is able to learn that the animal falls asleep 15 minutes after having a meal.

Also, in the case where the user changes to a reading state 30 minutes after the user is in an awake state at a frequency greater than a predetermined frequency, the device 101(*a*) is able to learn that the human starts reading 30 minutes after waking up.

The above-described learning is an example, and learning may be made, for instance, using a combination of the state of the animal and the state of the user.

Therefore, when the life patterns are stored as log information in the living thing state storage DB 207, it is possible to learn the life patterns related to the state of a living thing in the space to a certain extent.

Based on the learned life pattern of an animal and the life pattern of a user, the next transitional state from the current state of the animal or the user may be predicted.

This contributes to reduce the amount of information to be processed and to improve the accuracy of estimation by the living thing state estimator 205.

When the life patterns are managed as a table by the living thing state storage DB 207 in this manner, the information estimated by the living thing state estimator 205 may be outputted to the living thing state storage DB 207 of the recorder 204 rather than to the control detail determiner 206 directly. In step S403 described later, the control detail determiner 206 obtains information from the living thing state storage DB 207 and determines the details of control.

In the example of FIG. 8, a detection result is outputted every 15 minutes from the detector 201 to the living thing state estimator 205 of the control processor 203, and a result of estimated living thing state is stored in a table every 15 minutes. It is to be noted that the frequency of detection by the detector 201 and the frequency to estimation by the living thing state estimator 205 are not limited to 15 minutes.

The table 801 of FIG. 8 lists examples of log information as "example of state", the log information corresponding to each state illustrated in FIGS. 7A to 7F. For instance, the state which illustrates in FIG. 7A corresponds to log 3 illustrated in FIG. 8, and the state, in which one human is awake, sideways and reading and one animal is awake and face-on, is managed in the table 801 of the living thing state storage DB 207.

The states illustrated in FIGS. 7B to 7D correspond to logs 4 to 6 illustrated in FIG. 8, respectively. The states illustrated in FIGS. 7E and 7F correspond to logs 8 and 9 illustrated in FIG. 8, respectively.

It is to be noted that the "example of state" is listed in order to explain an example of correspondence between FIGS. 7A to 7F and the logs illustrated in FIG. 8, and is not necessarily stored in the table 801.

As described above, the living thing state estimator 205 determines whether or not a living thing is present in a space, estimates its number and state when present, and outputs the number and state to the control detail determiner 206. It is to be noted that the living thing state estimator 205 does not need to perform the processing in the order from step S501 to S504. Also, part of the steps may be skipped. The steps may be collectively performed. That is, as long as the living thing state estimator 205 is able to output at least one of pieces of information (i) to (iv) described as results to the control detail determiner 206, a different method may be used for the order and details of processing.

Figure 6:
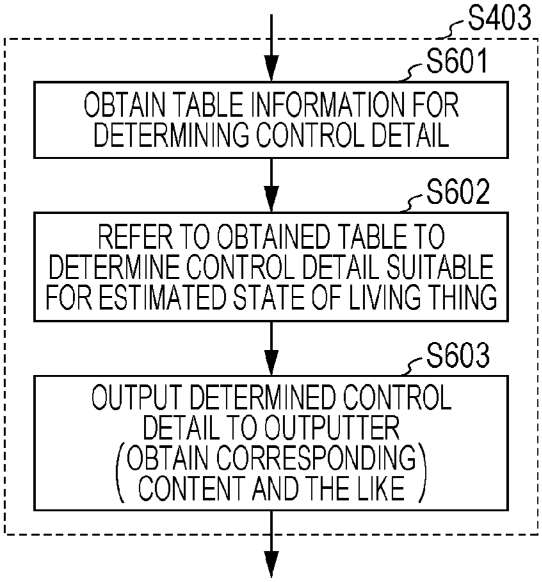
FIG. 6 is a flow chart illustrating an example of detailed processing of control detail determination in the first embodiment.

Subsequently, returning to the flow of FIG. 4, in step S403, the control detail determiner 206 of the control processor 203 determines the details of control of the device 101(*a*) according to the presence, the number, and the state of a living thing estimated by the living thing state estimator 205 in step S402. FIG. 6 is a flow chart illustrating an example of detailed processing of the control detail determiner 206.

First, in step S601, the control detail determiner 206 obtains table information for determining a control detail from the recorder 204. The table information is as illustrated in FIGS. 9 and 10, for instance and will be described later.

In step S602, the control detail determiner 206 refers to the table obtained in step S601 determines a control detail out of a plurality of control details based on the state of a living thing (a human or an animal) estimated in step S402. The control detail include, for instance, information on the operation performed by the outputter 202 of the device 101(*a*). In addition, the control detail may further include, for instance, information on the data (content) used for the operation performed by the outputter 202 of the device

101(*a*). The control detail determiner 206 outputs information to the outputter 202, the information for causing the outputter 202 to perform the operation which is indicated by the determined control detail.

A method to determining control detail will be described with reference to FIG. 9, FIG. 10 using a table which is for control detail determination and is managed by the recorder 204.

FIG. 9 is a diagram illustrating a table 901 which is an example of table information obtained from the recorder 204 by the control detail determiner 206. The table 901 is a table that defines the operation according to the state (activity) of a human and an animal, the operation being performed by the outputter 202 of the device 101(*a*).

The table 901 illustrated in FIG. 9 indicates information which is associated with, for instance, information on the state of a human, information on the state of an animal, and information on output (control detail).

For instance, "absent" in the column of human (animal) in the table 901 indicates that a state in which no human (animal) is present is estimated by the living thing state estimator 205.

For instance, "sleep" in the column of human (animal) in the table 901 indicates that a human (animal) is determined to be present and the human (animal) is estimated to be in a sleeping state (also referred to as a sleeping state) by the living thing state estimator 205.

For instance, "absent/sleep" in the table 901 indicates "absent" or "sleep" described above.

For instance, "awake" in the column of human (animal) indicates that a human (animal) is determined to be present and the human (animal) is estimated to be in an awake state by the living thing state estimator 205.

For instance, a case is discussed in which a human is determined to be "absent" or "sleep" and an animal is determined to be "absent" or "sleep" by the living thing state estimator 205 (for instance, a case in which determination of "No" is made in step S502 of FIG. 5). In this case, the control detail determiner 206 refers to the table 901 and determines an output (control detail) for which both the column of state of human and the column of state of animal are associated with "absent/sleep". The control detail is power supply OFF (standby mode) as illustrated in FIG. 9.

For instance, in the case where a human is determined to be present and "awake" and an animal is determined to be present and "awake" by the living thing state estimator 205, the control detail determiner 206 refers to the table 901 and determines an output (control detail) for which both the column of state of human and the column of state of animal are associated with "awake". The control detail is common content reproduction as illustrated in FIG. 9.

The common content reproduction is to cause the outputter 202 of the device 101(*a*) to reproduce content for human and animal in common (common content).

For instance, in the case where a human is determined to be present and "awake" and an animal is determined to be "absent" or "sleep" by the living thing state estimator 205, the control detail determiner 206 refers to the table 901 and determines an output (control detail) for which the column of state of human is associated with "awake" and the column of state of animal is associated with "absent/sleep". The control detail is human content reproduction as illustrated in FIG. 9.

The human content reproduction is to cause the outputter 202 of the device 101(*a*) to reproduce content for human (human content).

For instance, in the case where a human is determined to be "absent" or "sleep" and an animal is determined to be present and "awake" by the living thing state estimator 205, the control detail determiner 206 refers to the table 901 and determines an output (control detail) for which the column of state of human is associated with "absent/sleep" and the column of state of animal is associated with "awake". The control detail is animal content reproduction as illustrated in FIG. 9.

The animal content reproduction is to cause the outputter 202 of the device 101(*a*) to reproduce content for animal (animal content).

The control detail determiner 206 uses the table illustrated in FIG. 9 to determine control detail according to a result of the determination made by the living thing state estimator 205 or the state (activity) of a human and/or an animal which are determined to be present by the living thing state estimator 205. Thus, the operation indicated by the determined control detail is determined. The control detail determiner 206 outputs information (control command) to the outputter 202, the information for performing the operation which is indicated by the determined control detail.

It is to be noted that the table obtained by the control detail determiner 206 for determining control detail is not limited to the table 901. For instance, as described with reference to FIG. 7, in the case where not only information on the presence or absence and awake state of a human, an animal is estimated but also the orientation to the device 101(*a*) and/or the number of humans and animals are estimated, a table may be obtained in which the content to be outputted changes according to the orientation and the number.

FIG. 10 is a diagram illustrating a table 1001 which is an example of table information obtained from the recorder 204 by the control detail determiner 206.

Specifically, FIG. 10 is a diagram illustrating the table 1001 that manages the common content, the content for animal, and the content for human that have been described with reference to FIG. 9. The table 1001 is managed by the recorder 204. The content illustrated in FIG. 10 may include what is held in the content management DB 208 and the content which is distributed via a network or broadcast wave from a broadcast station.

The table 1001 manages content type, channel ID (CID), content name, purpose of content, source, and output adjustment which are associated with one another. The content type corresponds to the output detail determined by the control detail determiner 206 in FIG. 9. For instance, when the control detail determiner 206 determines reproduction of animal content as output detail (control detail) in step S602, one of the content C11 to C18 illustrated in the table 1001 is selected.

For instance, when the control detail determiner 206 determines reproduction of human content as output detail (control detail) in step S602, one of the content C21 and C22 illustrated in the table 1001 is selected.

For instance, when the control detail determiner 206 determines reproduction of common content as output detail (control detail) in step S602, one of the content C31 and C32 illustrated in the table 1001 is selected.

The control detail determiner 206 uses the table 1001 illustrated in FIG. 10 to determine control detail according to the state (activity) of a human and/or an animal, specifically, the data (content) used for the operation which is determined with reference to FIG. 9 and which is performed by the outputter 202.

The control detail determiner 206 outputs information (control command) to the outputter 202, the information for reproducing the content which is determined using FIG. 9.

A method of selecting one content is not particularly limited. For instance, when the time for broadcast or reproduction is fixed according to a content, it is sufficient to select the one matching the time and the content type.

In the case where a detailed state such as an orientation or an activity is estimated in the state estimation in step S402, the control detail determiner 206 may select a content for which the most appropriate purpose and effect are set according to the state. For instance, when one animal is estimated to be present and face-on to the device 101(*a*) as illustrated in FIG. 7B, the content, for which the purpose and effect is set to "curiosity and education", is selected from the table 1001. Here, for instance, the content "Active Doggy" of C11 is selected. Also, when one animal is estimated to be present and sideways with respect to the device 101(*a*) and eating as illustrated in FIG. 7C, the content, for which the purpose and effect is set to "appetite stimulation", is selected. Here, for instance, the content "Mischievous Doggy!" of C16 is selected. Also, when one human and one animal are estimated to be present and the animal is estimated to be face-on to the device 101(*a*) as illustrated in FIG. 7A, the content "pet album" of C32 is selected from the content for which the purpose and effect is set to "communication". The selection criterion for content is not limited to what has been described above.

In the description above, an example has been described in which the control detail determiner 206 selects the most appropriate content in relation to the purpose and effect of the content according to the presence or absence and state of a human and/or an animal. However, the configuration is not limited to this. For instance, the user may set the category of purpose and effect in advance for the content to be outputted in relation to the state according to the user's preference.

Accordingly, for instance, in the state as illustrated in FIG. 7B, a user may set the content having the purpose and effect of "curiosity and education", and another user may set the content having the purpose and effect of "communication". Therefore, it is possible to output a content in the state (timing) set by the user, the content reflecting the interest and orientation of the user (or animal).

When a human is present, the control detail determiner 206 of the device 101(*a*) may not select a content, but may display some content for recommendations selected from the content for human or the common content according to a state, and allows the user (human) to select a content.

Next, in step S603, the control detail determiner 206 outputs the determined control detail to the outputter 202. At this point, the control detail determiner 206 obtains the determined content.

That is, the control detail determiner 206 outputs the information (control command) for reproducing the content indicated by the determined control detail to the outputter 202 in order to cause the outputter 202 to reproduce the determined control detail.

The outputter 202 reproduces the content indicated by the determined control detail, according to the information from the control detail determiner 206.

In the present embodiment, it is assumed that desired content is held in the device 101(*a*), and thus essentially, the content desired for the content management DB 208 is managed. Therefore, the control detail determiner 206 obtains a content from the content management DB 208 in step S603.

However, as described above, some content may be held in the content management DB 208 and other content may be distributed via a network or broadcast wave from a broadcast station.

For instance, the table 1001 illustrated in FIG. 10 also manages the source of each content. For instance, the source of C11 to C17 is "dedicated video", and thus some content may be managed but other content may not be managed by the content management DB 208.

When a content is not managed by the content management DB 208, the control detail determiner 206 controls the device 101(*a*) so as to obtain the content through a network.

In this case, the device 101(*a*) includes, for instance, an information transmitter and receiver (not illustrated) that transmits and receives information via a network to and from an external device (not illustrated) that stores content. The control detail determiner 206 may control the information transmitter and receiver to obtain a content. The network may be, for instance, a wired network or a wireless network.

Also, C18 and C32 illustrated in the table 1001 of FIG. 10 have "photograph" as the source, and thus the control detail determiner 206 controls the device 101(*a*) so as to obtain a content related to photograph from the content management DB 208 of the device 101(*a*).

It is to be noted that the photograph may be captured by a user and includes what is recorded in the device 101(*a*) by the user. Also, when "photograph" is selected, it is desirable to perform control to reproduce a plurality of photographs in a slide show format. In addition, a slide show reproduction speed and a reproduction method may be changed according to the state of a human and/or an animal. In addition, a plurality of photographs to be reproduced may be selected according to the state of a human and/or an animal. Because C21 is "TV set", the control detail determiner 206 controls the device 101(*a*) so as to obtain radio waves for digital broadcasting.

It is to be noted that as the example of the table 1001, a table including only an instance of video content which is to be outputted has been described. However, the configuration is not limited to this. For instance, a content of sound only may be included.

It is to be noted that "output adjustment" is managed in the table 1001. For instance, according to the presence of a human or an animal in front of the device 101(*a*) or according to the type of an animal (such as a dog, a cat), the output method adopted by the outputter 202 may be adjusted (changed) according to the information indicated in "output adjustment". Here, in the table 1001, according to each content, one of categories of three types for output adjustment of dog, cat, and human is associated with and managed.

FIG. 11 is a diagram illustrating an example of a table 1101 that is associated with an output method according to the category of output adjustment of the table 1001 illustrated in FIG. 10. The table 1101 is also managed by the recorder 204.

In the table 1101, audio frequency, refresh rate, color tone compensation are managed based on a category (such as dog, cat, human) according to each output adjustment. For instance, the control detail determiner 206, when referring to the table 1001 and selecting a content for output, identifies the detail which is indicated by the category of output adjustment corresponding to the selected content. The control detail determiner 206 then refers to the table 1101 and identifies the detail which is indicated by each category of audio frequency, refresh rate, and color tone compensation, corresponding to the identified category of output adjustment. The control detail determiner 206 outputs information (control command) to the outputter 202, the information for reproducing the content identified in accordance with FIGS. 9 and 10 with a corresponding output adjustment.

The outputter 202 reproduces the content in accordance with the corresponding output adjustment based on the information from the control detail determiner 206.

For instance, when a content with the output adjustment of "dog" in the table 1001 is selected, the control detail determiner 206 refers to the table 1101 and outputs sound in a range of 40 to 47 kHz which is optimum audio frequency for dogs, performs color tone compensation on a content (video) image mainly with blue and yellow, and outputs an instruction to the outputter 202 for reproducing the content (video) image with a refresh rate of 120 Hz.

When the content (video) image, which is instructed to be reproduced, includes sound, in sound reproduction, the outputter 202 reproduces sound having a frequency of 40 to 47 kHz.

The outputter 202 reproduces the content (video) image, which is instructed to be reproduced, with a refresh rate of 120 Hz.

In addition, the outputter 202 performs color tone compensation so as to increase the rate of, for instance, blue and yellow components in color components included in the colors for displaying the content (video) image which is instructed to be reproduced.

In this manner, the control detail determiner 206 is capable of controlling reproduction of the content (video) image by the outputter 202.

It is to be noted that the refresh rate is the number of images outputted per second. For instance, when the refresh rate is 120 Hz, 120 images are outputted per second. It is generally said that when a video is outputted with a refresh rate of 60 Hz which is the most suitable for human, the video is replayed with frame-by-frame advance for dogs, which is unsuitable. It is also said that audio band and visually recognizable color are different between animal and human, and also different depending on the type of animal.

Therefore, the refresh rate for the videos included in a content selected from the content illustrated in FIG. 10, that is, the output method is adjusted (changed) according to an output adjustment corresponding to the selected content. Specifically, reproducing the videos and sound included in a content with the most suitable audio band, refresh rate, and color tone as listed in the table 1101 allows the content to be outputted by the most suitable output method according to a human or an animal.

That is, a video to be reproduced by the outputter of the electronic device is reproduced with a refresh rate of a video which is visually recognizable by animals, and sound to be reproduced by the outputter of the electronic device is reproduced with adjusted audio frequencies audible by animals.

With this configuration, the electronic device is automatically controllable based on a state of coexistence between a human and an animal in addition to the current state of the animal. Thus, for instance, when an owner and a pet are watching a TV together, a communication related video enjoyable for both the owner and the pet may be reproduced. A photo album, which mainly includes photographs of the owner and the pet as photographic objects, may be reproduced in a slide show format. The sound of the TV set program being watched by the owner may be synthesized with sound that makes the pet relax in audio frequencies audible by the pet. Air-conditioning setting may be automatically changed to temperature and humidity which are estimated to be the most suitable for coexistence of the human and the pet. Consequently, the most suitable content and a comfortable space may be provided to the human and the animal.

It is to be noted that in the table 1101 illustrated in FIG. 11, simplified description has been given in which a refresh rate and reproduction of a video or sound have been taken as examples, the refresh rate allowing a video visually recognizable by each of different animals according to the type (dog, cat) of an animal, the video or sound being with audio frequencies audible by animals. However, the video and the sound are not limited to those optimized for animals, and the video and the sound, which may be adopted, include a video that people enjoy every day, pleasant music for human with audio frequencies audible by human, dingle sound indicating start of something such as feeding, sound called white noise which is obtained from nature or sound artificially generated, cry of animals of the same kind belonging to some kinds of animals, and sound of nature such as jungle.

It is to be noted that in the examples of FIG. 10 and FIG. 11, the output method is changed according to the type of animal such as dog and cat, to which a content is provided. Accordingly to such change, the living thing state estimator 205 may be able to identify not only a human or an animal other than humans, but also the type (dog, cat) of animal other than humans in step S402. A method of identifying the type of animal is not particularly limited. The type of animal may be identified based on the characteristics (the shape and size of an area which is determined to be a living thing) of a two-dimensional image obtained by the detector 201. The type of animal may be easily identified by initially registering the types of animals that may be present in the space in which the device 101(*a*) is installed in advance by a user. For instance, in the case where only "cat" is registered in advance by a user, when the presence of a living thing other than a human is identified, the living thing is logically determined to be a cat, then the content for cats (for instance, C17 of the table 1001) may be selected or control may be performed to reproduce a content which is selected based on a reproduction method for "cat" in the table 1101.

As described above, in step S403, the control detail determiner 206 (the control detail determiner) determines control detail according to the estimated state. That is, when the living thing state estimator 205 (the living thing state estimator) determines one of (1) state in which a human and an animal are present, (2) state in which only an animal is present and no human is present, (3) state in which only a human is present and no animal is present, and (4) state in which neither a human nor an animal is present, the control detail determiner changes the control detail for the electronic device according to the determined state.

The electronic device includes an outputter that reproduces a video or sound, and when the living thing state estimator determines a state in which no human is present and only an animal is present and as long as the animal is estimated to be in an awake state, the control detail determiner causes the outputter to reproduce the video or the sound which is indicated by a control detail according to the estimated state of the animal.

Returning to the flow of FIG. 4, in step S404, the outputter 202 receives the control detail determined in step S403 from the control processor 203 and performs an output operation. Here, the outputter 202 receives the content which is determined by the control detail determiner 206 of the control processor 203, and the outputter 202 reproduces (displays) the content.

In the present embodiment, the configuration and processing method of the electronic device has been described so far, the electronic device being configured to estimate a state related to a human or an animal in a space and to determine and output control detail according to the estimated state. This configuration allows the electronic device to be automatically controlled based on the current state of the animal. Thus, for instance, even when a dog or a cat stays at home while the owner is not at home, a video or sound suitable for the dog or the cat may be automatically reproduced as long as the dog or the cat stays in front of a TV set or an audio equipment, and although the electronic device is not controllable by a dog and a cat themselves, stress of the dog due to loneliness while staying at home and insufficient level of physical exercise are reduced. Consequently, it is possible to provide a comfortable space to animals such as a dog and a cat.

In related art, there is a system that detects the presence or absence of a human and controls a device. However, an electronic device, which determines the presence or absence of a human and an animal at the same time and adjusts control detail of a device, has never been studied. Thus, in a space in which a human and an animal may be present, it has been not possible to provide the most suitable environment according to a situation for both.

For this reason, a user has to perform an inconvenient operation such as input of an instruction command as needed in order to change control detail according a situation at that time. Since the electronic device in the present embodiment estimates the presence or absence of a human and/or an animal as well as a situation and an activity to perform the most suitable control automatically, it is possible to provide the most suitable environment for the both human and animal without performing an inconvenient operation by a user.

It is to be noted that although a method of estimating a state and an activity of an animal and controlling the device according to the state and activity has been described in an example of the present embodiment, as illustrated in FIG. 12, the order of control over the device may be set in advance and an animal may be prompted to change the activity. FIG. 12 is a diagram illustrating an example of a table 1201 which is created by a user (human) in advance and in which target activities which an animal is prompted to follow are set every 15 minutes under the condition that the animal is present when the user (human) is absent.

The table 1201 specifies target activities which are intended to be directed to an animal when a user is absent.

The target activities include, for instance, waking up, exercising, eating, sleep inducing, and sleeping. In addition, the table 1201 includes, for instance, information on time to instruct the target activities, and information (control detail) on operations to be performed by the outputter 202 instructed by the control detail determiner 206 in order to prompt the animal to follow the target activities. In this example, the control detail includes a content ID (CID) of reproduction content which is to be reproduced by the outputter 202.

For instance, when the device 101(*a*) is a device (TV set) that reproduces a video and sound, information indicating the operations to be performed by the device 101(*a*) is, for instance, that the device 101(*a*) reproduces a content.

The device 101(*a*) has a scheduling function. The scheduling function is, for instance, such that the control detail determiner 206 outputs information to the outputter 202, the information for causing the outputter 202 to reproduce a reproduction content corresponding to a time indicated in the table 1201. In this manner, the control detail determiner 206 is able to manage the control details indicated in the table 1201 in the order instructed in a time sequence.

As illustrated in the table 1201, when a user sets the target activities in advance, the control detail determiner 206 determines a reproduction content that prompts for each of the target activities indicated in the table 1201. The control detail determiner 206 then determines a reproduction content that prompts for a corresponding one of the target activities according to the time indicated in the table 1201, and outputs information (control command) to the outputter 202, the information for causing the outputter 202 to reproduce the determined reproduction content.

In this manner, the reproduced content is able to induce an animal to follow an activity intended by a user (human).

For instance, when the table 1201 is created as illustrated in FIG. 12, waking up is indicated as a target activity at each time of 11:00, 11:15, 11:30, and C11 (active doggy) illustrated in FIG. 10 is indicated as a content corresponding to the target activity.

In this case, the control detail determiner 206 outputs information to the outputter 202 at each time of 11:00, 11:15, 11:30, the information for causing the outputter 202 to reproduce C11 illustrated in FIG. 10 as a content that prompts for wake-up.

For instance, in order to cause an animal to exercise, the control detail determiner 206 outputs information to the outputter 202 at 11:45, the information for causing the outputter 202 to reproduce C12 (bow-wow exercise) that is a content that prompts the animal to exercise.

Also, the control detail determiner 206 outputs information to the outputter 202 at 12:15, the information for C15 (sleep inducing) that is a content that prompts for inducing sleep. In this manner, when a user (human), the owner is away from home or on a trip, it is possible to induce and control the activity of a pet (animal) by controlling the operation of the device 101(*a*) in accordance with the details illustrated in the table 1201.

It is to be noted that an example has been described in which a target activity is set every 15 minutes. However, without being limited to this, a user may set a target activity every predetermined time of any length. Also, a user may directly set a reproduction content every predetermined time in advance. In addition, recommendation patterns (such as education precedence pattern, physical exercise precedence pattern, and sleep precedence pattern) related to the target activities may be held in the recorder 204 of the device 101(*a*). Thus, when a user is leaving home, selecting one of the recommendation patterns recommended by the device 101(*a*) allows the activity of an animal with the user absent to be controlled to some extent.

That is, the control detail determiner of the electronic device includes a scheduler that manages the order of a plurality of control details to be used in a time sequence. The scheduler holds a table that specifies target activities intended to be directed to the animal, a time at which each of the target activities is directed, and a control detail according to each target activity. The scheduler causes the electronic device to reproduce a video or sound indicated by the control detail according to each target activity at a time at which the target activity is directed.

This configuration allows a predetermined video or sound to be outputted in the order specified in the schedule. Thus, for instance, even when the owner is not at home, a video that prompts for physical exercise or a video or sound that suggests the timing for eating are reproduced to form a life rhythm, thereby avoiding lack of physical exercise and reducing stress accumulation of an animal, and an intended life pattern may be induced to the animal.

It is to be noted that description is given under the assumption that the device 101(*a*) is a TV set in the present embodiment. In the case where the device is other than a TV set, output may be given according to the device.

For instance, when the device 101(*a*) is an air conditioner, the outputter 202 has, for instance, a function of adjusting air direction, a function of adjusting air amount, and a function of adjusting temperature.

In this case, it is sufficient that information for causing the air conditioner to perform operations in the table 901 be recorded as control details, the operations being related to, for instance, adjustment of air direction, adjustment of air amount, and adjustment of temperature according the estimated state.

For instance, the table 901 is referred, control detail related to at least one of air direction, air amount, and temperature is determined in step S403 according to the state estimated in step S402, and the information for performing the control detail determined in step S404 may be outputted to the outputter 202.

The outputter 202 performs an operation of the air conditioner, such as adjustment of air direction, adjustment of air amount, or adjustment of temperature according to the received information.

Consequently, a comfortable air conditioned space may be achieved according to the presence, situation and activity of human and animal.

For instance, when the device 101(*a*) is an illumination device, the outputter 202 has a function of adjusting an optical output of illumination, for instance.

In this case, it is sufficient that information on adjustment of light quantity of illumination be recorded as control details in the table 901 of control details to achieve an optical output according to the estimated state, for instance.

For instance, the table 901 is referred, and control detail according to the state estimated in step S402 is determined in step S403. It is sufficient that information for performing the control detail determined in step S404 be outputted to the outputter 202.

The outputter 202 performs an operation of adjusting an optical output of illumination according to the received information.

Consequently, a comfortable illumination space may be achieved according to the presence, situation and activity of human and animal, and also effective for good sleep.

In the case where the device 101(*a*) is a device (for instance, an air cleaner or an aroma diffuser) that has a function of generating a scent and/or removing a smell, the outputter 202 has, for instance, a function of causing the device 101(*a*) to perform air cleaning to remove a smell and a function of causing the device 101(*a*) to perform scent generation.

In this case, it is sufficient that information for performing air cleaning or scent generation be recorded as control details in the table 901 of control details according to the estimated state, for instance.

For instance, the table 901 is referred, and control detail according to the state estimated in step S402 is determined in step S403. It is sufficient that information for performing the control detail determined in step S404 be outputted to the outputter 202.

The outputter 202 performs an operation of air cleaning or scent generation according to the received information.

Consequently, a comfortable scent space may be achieved according to the presence, situation and activity of human and animal, and relaxation effect may be expected. In this case, it is preferable to generate a different scent according to a state in which only animal is present or a state in which only human is present.

In general, pleasant smell for human and pleasant smell for animals such as a dog are different. Therefore, pleasant scent space may be achieved for both human and animal by generating different smells according to the presence of animal or human.

In the present embodiment, control is performed so that the control detail determiner 206 determines control detail corresponding to the occasional state which is estimated by the living thing state estimator 205. However, the configuration is not limited to this. For instance, the control detail determiner 206 may determine the most suitable control detail according to the timing of change in the state which is estimated by the living thing state estimator 205, and may control the outputter 202. For instance, at the timing of change from "awake" state to "sleeping" state of human or animal, the change being estimated by the living thing state estimator 205, information for stopping reproduction of the content indicated by the control detail corresponding to "awake" state may be outputted to the outputter 202 so that reproduction of the content by the device 101(*a*) may be stopped.

Also, information for reproducing a content may be outputted to the outputter 202 at the above-mentioned timing of estimation, the content being indicated by the control detail corresponding to post-change state ("sleeping" state in this instance). Consequently, a content to be reproduced may be changed according to a change in the estimated state.

That is, the electronic device includes an outputter 202 that performs a predetermined operation.

As long as the state of the animal is estimated to be awake state by the living thing state estimator or when a change in the state of the animal from "sleeping" state to "awake" state is estimated by the living thing state estimator 205 (the living thing state estimator), the control detail determiner 206 (the control detail determiner) causes the outputter to perform the operation which is indicated by the control detail corresponding to the awake state.

In addition, as long as the state of the animal is estimated to be sleeping state by the living thing state estimator, the control detail determiner causes the outputter to perform the operation which is indicated by the control detail corresponding to the sleeping state.

In addition, when a change in the state of the animal from the awake state to the sleeping state is estimated by the living thing state estimator, the control detail determiner causes the outputter to stop the operation which is indicated by the control detail corresponding to the awake state.

Also, the predetermined operation includes an operation of reproducing a video and an operation of reproducing sound.

The operation indicated by the control detail corresponding to the awake state of the animal may be an operation of causing the outputter to reproduce a video or sound corresponding to the awake state.

The operation indicated by the control detail corresponding to the sleeping state of the animal may be an operation of causing the outputter to reproduce a video or sound corresponding to the sleeping state.

The predetermined operation includes an operation of adjusting an optical output of illumination.

The operation indicated by the control detail corresponding to the awake state of the animal may be an operation of causing the outputter to adjust an optical output of illumination corresponding to the awake state.

The operation indicated by the control detail corresponding to the sleeping state of the animal may be an operation of causing the outputter to adjust of an optical output of illumination corresponding to the sleeping state.

The predetermined operation includes an operation of air cleaning to remove a smell and an operation of generating a scent.

The operation indicated by the control detail corresponding to the awake state of the animal may be an operation of causing the outputter to perform air cleaning to remove a smell, corresponding to the awake state or an operation of causing the electronic device to perform scent generation corresponding to the awake state.

The operation indicated by the control detail corresponding to the sleeping state of the animal may be an operation of causing the outputter to perform air cleaning to remove a smell, corresponding to the sleeping state or an operation of causing the electronic device to perform scent generation corresponding to the sleeping state.

When the living thing state estimator determines a state in which no human is present and only an animal is present and as long as the animal is estimated to be in the awake state, the control detail determiner of the electronic device causes the outputter to reproduce the video or the sound which is indicated by a control detail according to the estimated state of the animal.

When the determination by the living thing state estimator is changed from a state in which the animal is present and no human is present to a state in which the animal and human are present or when the estimation on the state of the animal by the living thing state estimator is changed from the awake state to the sleeping state, the control detail determiner causes the outputter to stop reproduction of the video or the sound, or causes the outputter to reproduce a video or sound which is indicated by a control detail according to the changed state of the animal.

Modification of First Embodiment

Figure 13:
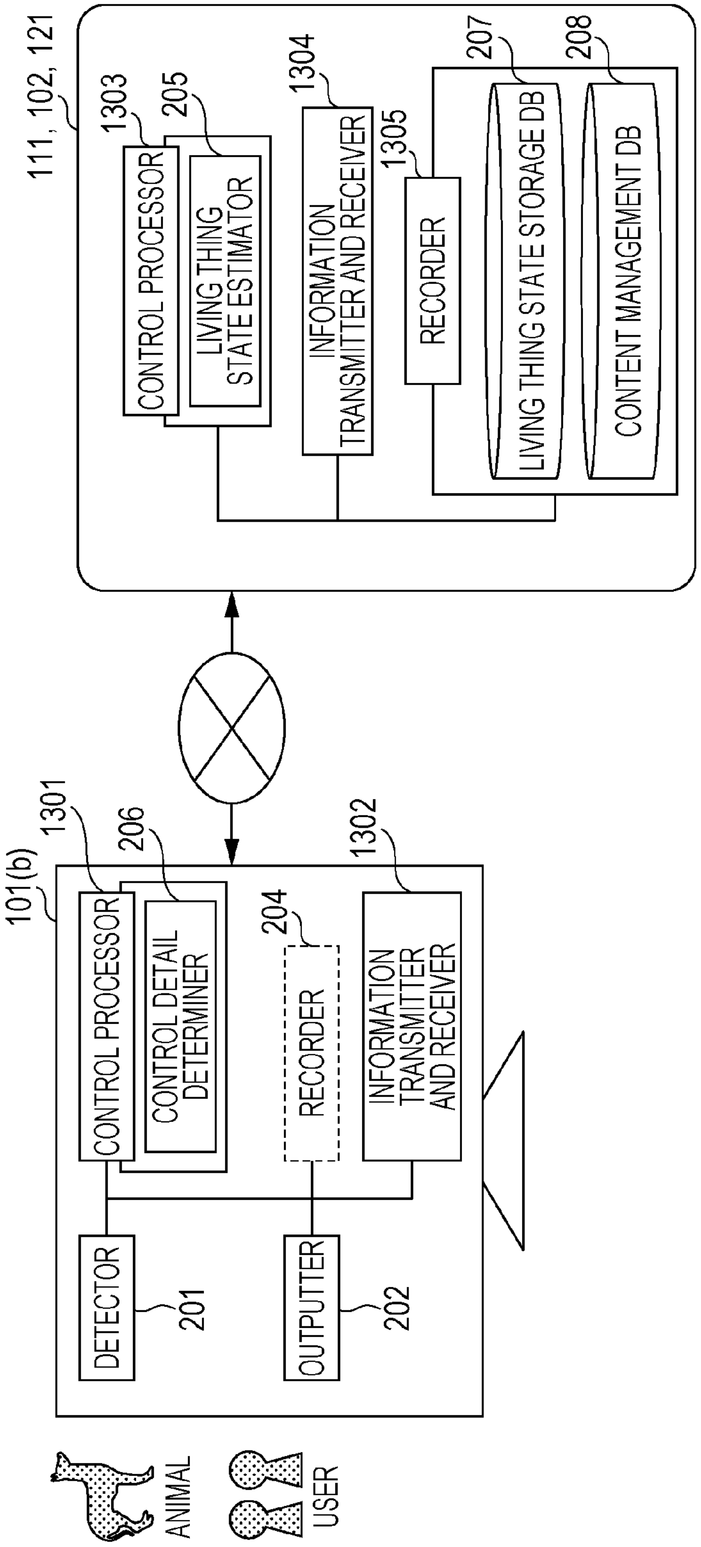
FIG. 13 is a diagram illustrating an example of a configuration of an electronic device and a cloud server in a modification of the first embodiment.

FIG. 13 is a diagram illustrating an example of a configuration of an electronic device and a cloud server in a modification of the first embodiment. Specifically, FIG. 13 is a diagram illustrating an example of the configuration of devices in the modification in which partial configuration of a control processor in the present embodiment is implemented by an external device (server device) such as the cloud server 111, the server 121, or the home gateway 102 illustrated in FIG. 1. In the present modification, the device 101(*b*) performs processing while exchanging information with the cloud server 111 (or the server 121 or the home gateway 102).

Hereinafter, the different points from the configuration diagrams illustrated in FIGS. 2 and 3 will be mainly described. The same component as those illustrated in FIGS. 2 and 3 is denoted by the same symbol and a description is omitted.

The different point between the device 101(*b*) of FIG. 13 and the device 101(*a*) of FIG. 2 is that a control processor 1301 of the device 101(*b*) does not include the living thing state estimator 205 and the device 101(*b*) includes an information transmitter and receiver 1302.

The information transmitter and receiver 1302 is a component for transmitting and receiving information to and from the cloud server 111 (or the server 121, or the home gateway 102) via a network and is indispensable in the present modification. It is sufficient that a typical communication module be adopted as the information transmitter and receiver 1302, and the specification is not particularly limited. Also, communication system for transmitting and receiving information is not particularly limited.

For instance, the information transmitter and receiver 1302 may be achieved by the following manner: a program for a communication module which serves as the information transmitter and receiver 1302 is stored in a memory (not illustrated) included in the device 101(*b*), and the program is executed by a processor (not illustrated) included in the device 101(*b*).

Alternatively, the information transmitter and receiver 1302 may be formed using a circuit that serves as a communication module.

The cloud server 111 includes a control processor 1303, an information transmitter and receiver 1304, and a recorder 1305. The control processor 1303 and the information transmitter and receiver 1304 may achieve their functions by the following manner: a program which achieves the function of each of the components is stored, for instance, in a memory (not illustrated) included in the cloud server 111 and the program is executed by a processor (not illustrated) included in the cloud server 111.

Alternatively, the control processor 1303 and the information transmitter and receiver 1304 may be formed using circuits that achieve respective functions of the control processor 1303 and the information transmitter and receiver 1304.

The control processor 1303 includes the living thing state estimator 205. The operation of the living thing state estimator 205 is the same as the operation described in the first embodiment.

The information transmitter and receiver 1304 transmits and receives information to and from a device such as the device 101(*b*) via a network.

The recorder 1305 includes a living thing state storage DB 207 and the content management DB 208. The fundamental functions of the living thing state storage DB 207 and the content management DB 208 and data to be recorded and managed are as described in the first embodiment.

The operation of each device and each component and flow of processing in the present modification are the same as the operation and flow of processing that have been described with reference to FIGS. 4 to 12 in the first embodiment. That is, in the present modification, information is transmitted and received as needed between the information transmitter and receiver 1302 of the device 101(*b*) and the information transmitter and receiver 1304 of the cloud server 111, and thus processing is performed fundamentally in the order as illustrated in FIG. 4.

Therefore, the present modification has the same operation and effect as those in the first embodiment.

The operation of each device and each component and flow of processing in the present modification will be briefly described. For instance, the information transmitter and receiver 1302 transmits information on the space to the cloud server 111 via a network, the information being detected by the detector 201 at predetermined time intervals. The information on the space is information related to the space in which device 101(*b*) is disposed and refers to the image and the sensor data as described in the first embodiment.

Here, description is given by taking the image explained in the first embodiment as an example of the information on the space.

The information transmitter and receiver 1304 of the cloud server 111 outputs received images to the control processor 1303.

The living thing state estimator 205 of the control processor 1303 determines whether or not a living thing is present in the space in which the device 101(*b*) is disposed based on a change in the received images, and estimates a state of the living thing which is determined to be present.

A result of the determination made by the living thing state estimator 205 and the estimated state of the living thing are transmitted to the device 101(*b*) by the information transmitter and receiver 1304.

The determination result and the estimated state of the living thing received from the cloud server 111 are outputted to the control processor 1301 by the information transmitter and receiver 1302 of the device 101(*b*).

The control detail determiner 206 of the control processor 1301, when receiving an estimation result, determines control detail according to a state of an animal estimated by the living thing state estimator 205, the control detail to be performed by the outputter 202 of the device 101(*b*). The control detail determiner 206 then outputs information (control command) to the outputter 202, the information for causing the outputter 202 to perform the determined control detail.

The main different point between the first embodiment and the modification is that the cloud server 111 includes the living thing state estimator 205 and the recorder 1305 of the cloud server 111 stores fundamental information. This reduces the amount of processing to be performed by the device, and thus a high performance processor does not have to be mounted on the device.

Also, each table and content do not have to be recorded and managed by the device, and thus the recording capacity of the device may be reduced. That is, even with a low throughput device, the most suitable device control may be performed by estimating the state of human and animal.

In addition, log information from the device 101(*b*) is obtainable in the cloud server 111, and thus further information analysis, study using a large quantity of information, and utilization of information may be expected. Furthermore, combined analysis of log information obtained from individual devices owned by different users allows a new valuable service to be provided.

For instance, it is possible to learn the life pattern of a user who keeps the same type of animal and the life pattern of the animal.

That is, the state of human is a state of a user who is the owner of the animal. The electronic device further includes a living thing state storage database that stores temporal transition of the state of the animal and temporal transition of the state of the user. The living thing state estimator learns the life pattern of the animal or the life pattern of the user from the temporal transition of the state of the animal and the temporal transition of the state of the user that are stored in the living thing state storage database, and predicts the transition of the state of the animal or the transition of the state of the user from the learned life pattern of the animal or life pattern of the user.

It is to be noted that various devices such as a TV set, an air conditioner, an illumination, or an air cleaner may be adopted as the device 101(*b*) in the present modification as described above.

Also in the present modification, the device 101(*b*) and the cloud server 111 may include a component other than the components described above.

Second Embodiment

Configuration of Each Device

Figure 14:
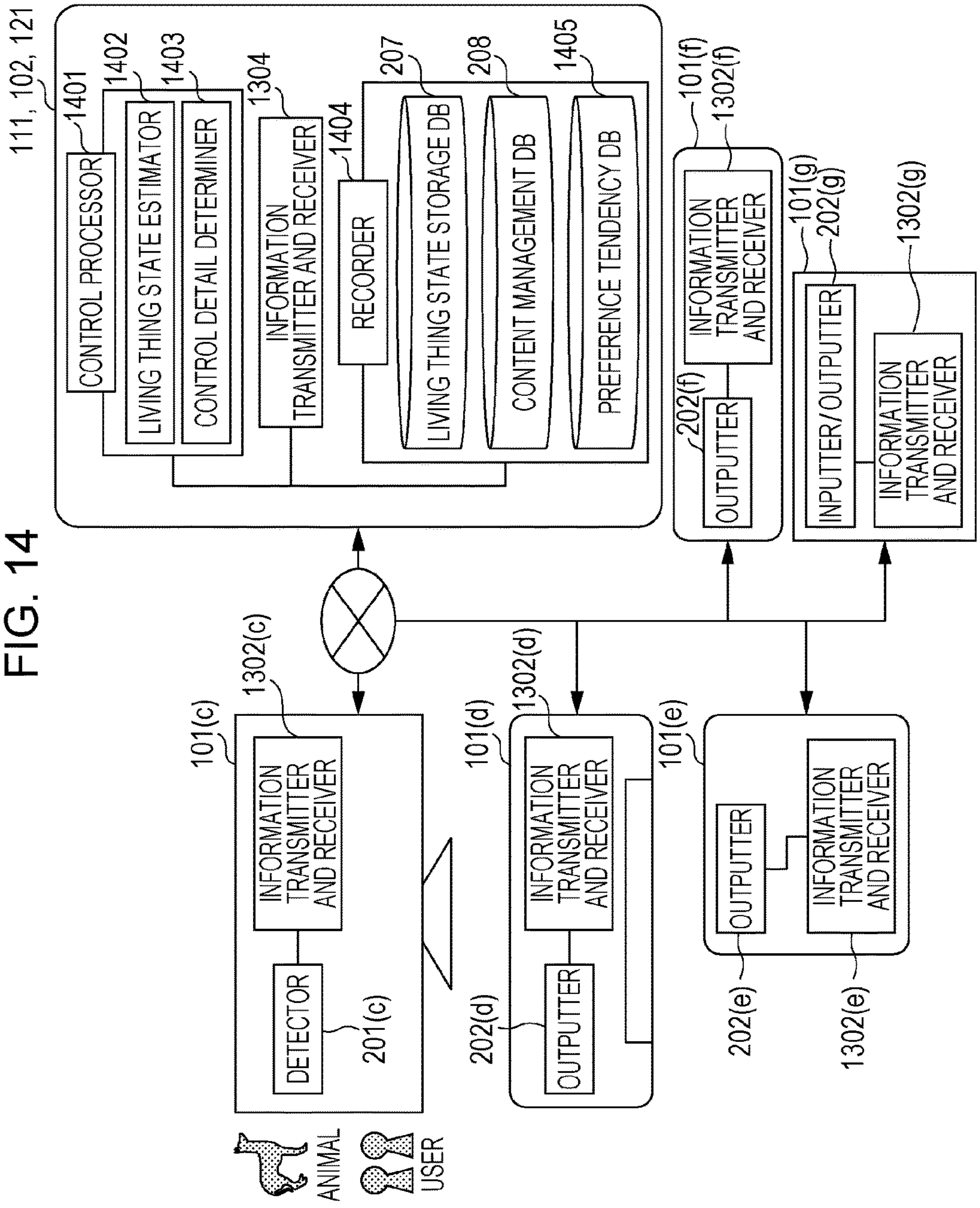
FIG. 14 is a diagram illustrating an example of a configuration of electronic devices and a cloud server in a second embodiment.

FIG. 14 is a diagram illustrating an example of a configuration of electronic device system including electronic devices and a cloud server in a second embodiment. Specifically, FIG. 14 is a diagram illustrating an example of a configuration of device 101(*c*), device 101(*d*), device 101(*e*), device 101(*f*), device 101(*g*), and the cloud server 111 (may be the server 121 or the home gateway 102) in the second embodiment. Regarding the components of each of devices below, the same component as those in the first embodiment and in the modification of the first embodiment are denoted by the same symbol and a description is given. Part of the description of the same component as those in the first embodiment and in the modification of the first embodiment is omitted.

The device 101(*c*) includes the detector 201(*c*) and the information transmitter and receiver 1302(*c*). The device 101(*c*) is disposed in the same space as the space (for instance, a room in a house) in which the device 101(*d*), the device 101(*e*), the device 101(*f*), and the device 101(*g*) are disposed. The fundamental function of these components is the same as the function of the components (the detector 201, the information transmitter and receiver 1302) described with reference to FIG. 13. Here, any device may be used as the device 101(*c*). Similarly to the first embodiment, it may possible to use a TV set, a mobile terminal including a detector and an information transmitter and receiver, a terminal worn by human or animal, (wearable terminal), or an air conditioner. It is to be noted that when a terminal worn by human or animal (wearable terminal) is used as the device 101(*c*), the detector 201(*c*) may be a sensor that obtains living body information (vital information, activity information) such as a physical activity meter, a pedometer, a sphygmomanometer, a heart rate meter. Also, the detector 201(*c*) may be a moving sensor for animals that recognizes a low height of a small animal by an infrared sensor to detect passing of the animal through an area. Also, the detector 201(*c*) may be a sound collecting microphone that collects sound such as roar or cry directly or indirectly. The device 101(*c*) may include another component which is not illustrated.

The device 101(*d*) includes the outputter 202(*d*) and the information transmitter and receiver 1302(*d*). In the present embodiment, an example will be described in which an air conditioner is used as the device 101(*d*).

Thus, the output of the outputter 202(*d*) includes power supply ON/OFF, operational mode, control of temperature, control of air direction, and control of air amount for an air conditioner. For instance, the information transmitter and receiver 1302(*d*) receives information (control command) from the cloud server 111 via a network, the information for operating the outputter 202(*d*). The information transmitter and receiver 1302(*d*) is the same as the information transmitter and receiver 1302 described with reference to FIG. 13. It is to be noted that device 101(*d*) may include another component which is not illustrated.

The device 101(*e*) includes the outputter 202(*e*) and the information transmitter and receiver 1302(*e*). In the present embodiment, an example will be described in which as the device 101(*e*), for instance, a humidifier/dehumidifier, an air cleaner (including an aroma diffuser) is used.

Thus, the output of the outputter 202(*e*) includes power supply ON/OFF, control of humidification, control of dehumidification, control of deodorization, and generation of scent (aroma). For instance, the information transmitter and receiver 1302(*e*) receives information (control command) from the cloud server 111 via a network, the information for operating the outputter 202(*e*). The information transmitter and receiver 1302(*e*) is the same as the information transmitter and receiver 1302 described with reference to FIG. 13. It is to be noted that device 101(*e*) may include another component which is not illustrated.

The device 101(*f*) includes the outputter 202(*f*) and the information transmitter and receiver 1302(*f*). In the present embodiment, an example will be described in which an illumination device is used as the device 101(*f*). Thus, the output of the outputter 202(*f*) includes power supply ON/OFF, and dimming control. For instance, the information transmitter and receiver 1302(*f*) receives information (control command) from the cloud server 111 via a network, the information for operating the outputter 202(*f*). The information transmitter and receiver 1302(*f*) is the same as the information transmitter and receiver 1302 described with reference to FIG. 13. It is to be noted that device 101(*f*) may include another component which is not illustrated.

The device 101(*g*) includes the inputter/outputter 202(*g*) and the information transmitter and receiver 1302(*g*). In the present embodiment, an example will be described in which a smartphone is used as the device 101(*g*).

Thus, the inputter/outputter 202(*g*) includes a display such as a touch panel, a microphone that receives sound, and a speaker that outputs sound. Also, the output of the inputter/outputter 202(*g*) includes display on a display, and sound output from a speaker. For instance, the information transmitter and receiver 1302(*g*) receives information (control command) from the cloud server 111 via a network, the information for operating the outputter 202(*g*). The information transmitter and receiver 1302(*g*) is the same as the information transmitter and receiver 1302 described with reference to FIG. 13. It is to be noted that device 101(*g*) may include another component which is not illustrated.

The cloud server 111 includes a control processor 1401, the information transmitter and receiver 1304, and a recorder 1404.

The control processor 1401 is essentially the same as the control processor 203 included in the device 101(*a*) which has been described in the first embodiment. The control processor 1401 includes a living thing state estimator 1402, and a control detail determiner 1403. A specific living thing state estimation method and control detail determination method of the living thing state estimator 1402 and the control detail determiner 1403 will be described later.

The information transmitter and receiver 1304 has the same configuration as the configuration described with reference to FIG. 13, and thus description is omitted.

The recorder 1404 includes the living thing state storage DB 207, the content management DB 208, and a preference tendency DB 1405. The living thing state storage DB 207 and the content management DB 208 are the same as those described in the first embodiment, and thus description is omitted. The information managed by the preference tendency DB 1405 will be described later.

[Operation of Each Device and Processing Flow]

Figure 15:
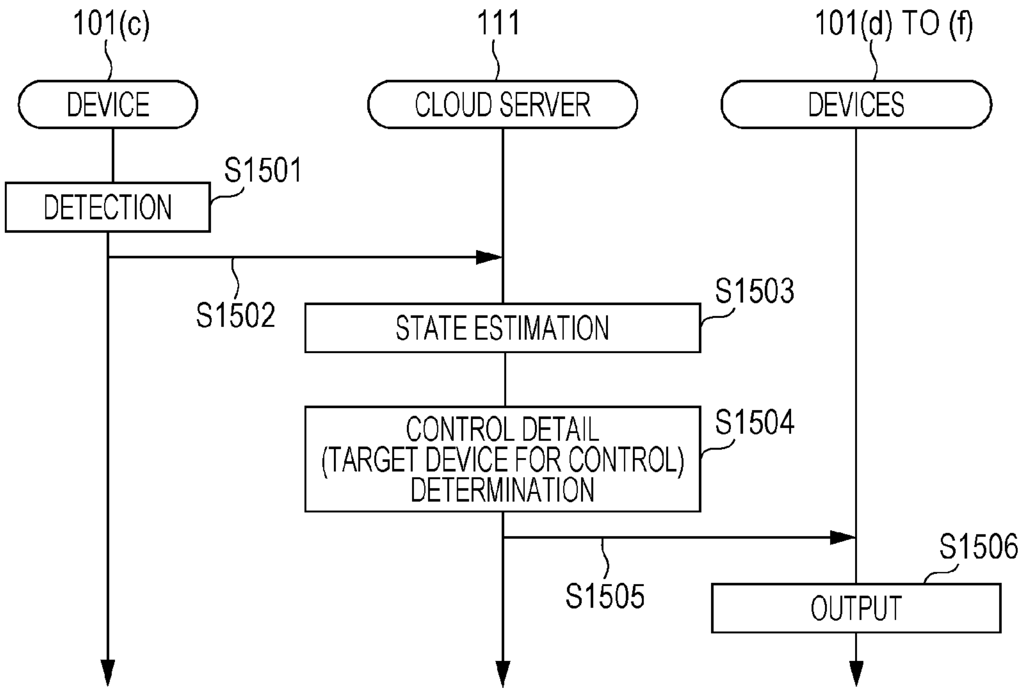
FIG. 15 is a sequence chart illustrating an example of operation of the devices and flow of processing in the second embodiment.

FIG. 15 is a sequence chart illustrating an example of operation of the devices and flow of processing in the present embodiment. Hereinafter, the different points from the flow chart of the first embodiment illustrated in FIG. 4 will be mainly described.

First, in step S1501, the detector 201(*c*) of the device 101(*c*) detects the state of a predetermined space (room). The step S1501 is essentially the same as step S401 illustrated in FIG. 4. However, as described above, when the detector 201(*c*) is a living body sensor provided in a terminal which is worn by human or animal, information to be obtained is living body information instead of two-dimensional images in a space.

In step S1502, the information transmitter and receiver 1302(*c*) of the device 101(*c*) transmits the information obtained in step S1501 to the cloud server 111. Also, the information transmitter and receiver 1304 of the cloud server 111 receives the information from the device 101(*c*).

Here, the frequency detected by the detector 201 in step S1501 and the timing at which the information transmitter and receiver 1302(*c*) transmits information in step S1502 are not particularly limited. It is sufficient that information be detected and transmitted at predetermined time intervals.

In step S1503, the living thing state estimator 1402 of the control processor 1401 of the cloud server 111 estimates the state in a space or the state of human and/or animal based on the received information. Here, when the detector 201 has detected a two-dimensional image by an image capture device, the presence or absence of a living thing in a space, the number of living things, and the state, orientation, and activity of the living thing are estimated by the same method (such as in FIG. 5) as in the first embodiment.

Also, when the detector 201 is a living body sensor of a terminal worn by human or animal, the state and emotion of the human or the animal wearing the above-mentioned terminal are estimated from the obtained living body information.

In this case, when the information on which human and/or animal wearing the device 101(*c*) and the information on the location (such as a room in a house) where the device 101(*c*) is used are managed in the cloud server 111, it is possible to recognize the state of the human or the animal wearing the device 101(*c*) in the location where the device 101(*c*) is used.

Thus, in this case, as described in the first embodiment, estimation of the presence or absence of a human and/or an animal is unnecessary. Also, a known method may be used for estimation of the state and emotion, and detailed description is omitted. The estimated state at this point may be recorded and stored in the living thing state storage DB of the recorder 1404. When the detector 201 is a sound collecting microphone, degree of stress and tension may be estimated from the sound such as roar or cry.

Next, in step S1504, the control detail determiner 1403 of the control processor 1401 in the cloud server 111 determines control detail based on the state estimated in step S1503. FIG. 16 is a diagram illustrating an example of a table 1601 that is used by the control detail determiner 1403 for determining control detail.

For instance, when the human is estimated to be "not present" and the animal is estimated to be "not present" in step S1503, the control detail determiner 1403 refers to the table 1601 and determines that the output of the air conditioner (device 101(*d*)), the air cleaner, humidifier, dehumidifier (device 101(*e*)), and the illumination device (device 101(*f*)) is set to power supply OFF (or standby mode, light off).

For instance, when the human and the animal are estimated to be "present" and both the human and the animal are estimated to be "sleeping", the control detail determiner 1403 refers to the table 1601 and determines that the output of the air conditioner (device 101(*d*)), the air cleaner, humidifier, dehumidifier (device 101(*e*)) is set to sleep mode and determines that the output of illumination is set to be low.

For instance, when the human and the animal are estimated to be "awake" in step S1503, the control detail determiner 1403 refers to the table 1601 and determines that the output of the air conditioner (device 101(*d*)), the air cleaner, humidifier, dehumidifier (device 101(*e*)), and the illumination device (device 101(*f*)) is set to common operational mode.

For instance, when the human is estimated to be "awake" and the animal is estimated to be "not present" or "sleeping" in step S1503, the control detail determiner 1403 refers to the table 1601 and determines that the output of the air conditioner (device 101(*d*)), the air cleaner, humidifier, dehumidifier (device 101(*e*)) is set to human comfortable mode. Also, the output of the illumination device (device 101(*f*)) is determined to be light on (for human).

For instance, when the human is estimated to be "not present" or "sleeping" and the animal is estimated to be "awake" in step S1503, the control detail determiner 1403 refers to the table 1601 and determines that the output of the air conditioner (device 101(*d*)), the air cleaner, humidifier, dehumidifier (device 101(*e*)) is set to animal comfortable mode. Also, the output of the illumination device (device 101(*f*)) is determined to be light on (for animal).

The operational modes (common operation mode, human comfortable mode, and animal comfortable mode) of the devices illustrated in FIG. 16 are as specified in table 1701 of FIG. 17. FIG. 17 is a diagram illustrating an example of a table that determines an operational mode of each of the devices in the second embodiment.

The table 1601 and the table 1701 may be held in the recorder 1404 or may be held in the device 101(*c*). The table 1601 may be a table created by a user of the device 101(*c*) using a certain UI (for instance, the inputter/outputter 202(*g*) of the device 101(*g*)) or may be a table which is provided as initial setting at device or service provision by a business operator such as the data center operating company 110 (the service provider 120, device manufacturer) illustrated in FIG. 1.

The control details determined by the control detail determiner 1403 are not limited to those illustrated in the table 1601 and the table 1701. The table 1601 and the table 1701 may be editable by a user (human) using a certain UI (for instance, the inputter/outputter 202(*g*) of the device 101(*g*)). Also, control details of other devices may be added to each of the tables. For instance, when human is "not present" and the animal is "sleeping", control detail may determine that is notifying the smartphone (device 101(*g*)) of the operating condition of the air conditioner (device 101(*d*)) and UI prompting to change setting.

Returning to FIG. 15, in step S1505, the information transmitter and receiver 1304 of the cloud server 111 transmits information (control command) for causing a corresponding device to perform the operation indicated by the control detail determined in step S1504. Here, although it is desirable in step S1505 that the information transmitter and receiver 1304 transmit a control data each time the control detail is determined in S1504, the configuration is not limited to this. For instance, a corresponding control command may be transmitted to each device periodically at predetermined time intervals.

In step S1506, the device 101(*d*) to (*f*) perform an output operation according to a control command transmitted from the cloud server 111.

In the present embodiment above, based on the information on a space or the living body information on human and animal, detected by the device 101(*c*), a state of the human or the animal is estimated by the cloud server 111, and control details for controlling the devices other than the device 101(*c*) (the devices 101(*d*) to (*f*) in this instance) are determined by the cloud server 111. Then information for operating each of the devices (for instance, the devices 101(*d*) to (*f*)) indicated by the determined control details is transmitted to a corresponding one of the devices. The devices (devices 101(*d*) to (*f*)) which received the information operate based on the received information. With this configuration, the cloud server 111 controls the corresponding device. According to this configuration, similarly to the first embodiment, it is possible to provide the most suitable environment for the both human and animal without performing an inconvenient operation by a user. In the present embodiment, processing related to estimation of state and determination of a control detail, storage of information, and management of tables are performed by the cloud server 111. Therefore, it is unnecessary to mount a high throughput processor or a memory on the devices.

Also, in the present embodiment, a plurality of devices and the cloud server work together to determine control details. Therefore, it is possible to optimally control the devices based on only information from a detector mounted on one device, and thus detectors do not have to be mounted on respective devices.

In addition, information according to the characteristics of an animal may be stored in the recorder 1404.

The characteristics of an animal includes, for instance, information indicating whether the animal is sensitive to pollution in air, information indicating whether the animal does not like change of the environment, information indicating whether the animal is sensitive to stress, and information indicating whether the animal is sensitive to dryness and/or moisture.

When a target animal to be estimated is known in advance like a pet kept by a user, the characteristics of the pet may be registered in the recorder 1404 of the cloud server 111 by the user who understands the characteristics.

Alternatively, the characteristics of an animal may be, for instance, general characteristics of a target animal to be estimated. In this situation, in the case where information on the type of animal is stored in the recorder 1404 of the cloud server 111, information on the characteristic of the animal does not need to be stored.

For instance, an air cleaner connected to the cloud server 111 via a network is controllable as follows, the air cleaner corresponding to the device 101(*e*).

For instance, in the case where the living thing state estimator 1402 estimates that an animal is present in the space in which the air cleaner is disposed, when information indicating that the animal is sensitive to pollution in air has been stored in the recorder 1404 as the characteristic of the animal, a control command is transmitted to the air cleaner via a network, the control command for performing the control detail of frequent cleaning of air.

For instance, in the case where the living thing state estimator 1402 estimates that a target animal is not present in a room (space) in which the air cleaner is disposed, when information indicating that the animal does not like change of environment has been stored in the recorder 1404 as the characteristic of the animal, a control command is transmitted to the air cleaner via a network, the control command for performing the control detail of cleaning of air.

For instance, in the case where the living thing state estimator 1402 estimates that an animal is present in the room in which the air cleaner is disposed, when information indicating that the animal is sensitive to stress has been stored in the recorder 1404 as the characteristic of the animal, a control command is transmitted to the air cleaner via a network, the control command for performing the control detail of generating aroma scent that reduces stress of the animal.

For instance, in the case where the living thing state estimator 1402 estimates that an animal is present in the room in which the air cleaner is disposed, when information indicating that the animal is sensitive to dryness and/or moisture has been stored in the recorder 1404 as the characteristic of the animal, a control command is transmitted to the air cleaner via a network, the control command for performing the control detail of humidifying and/or dehumidifying the room in which the air cleaner is disposed.

In this case, it is desirable to set target values in the air cleaner in advance, the target values indicating how the temperature and humidity of the room in which the air cleaner is disposed are adjusted when humidification and/or dehumidification are performed. It is sufficient that information on the targeted values be set in the air cleaner or the cloud server 111 in advance by a user.

When there are a plurality of types of target animals to be estimated for the presence in the room in which the air cleaner is disposed, a target value may be set for each of the types of the animals.

In this manner, the air cleaner is controllable according to the characteristics of an animal.

That is, the electronic device system includes: an information transmitter and receiver that transmits and receives information via a network to and from a first electronic device and a second electronic device installed in a predetermined space; a living thing state estimator that determines whether or not at least an animal other than a human is present based on information on the predetermined space, and estimates a state of the animal that is determined to be present, the information being detected by a detector included in the first electronic device and being received by the information transmitter and receiver; and a control detail determiner that determines a control detail for the second electronic device, according to a result of the determination or the estimated state of the animal. The information transmitter and receiver transmits information to the second electronic device via the network, the information for performing an operation indicated by the determined control detail.

Also, the second electronic device is an air cleaner, and the control detail is further associated with a characteristic of the animal, in the case where the characteristic of the animal is that the animal is sensitive to pollution in air, when the living thing state estimator determines that the animal is present, the control detail determiner selects a control detail that indicates an operation for causing the air cleaner to perform air cleaning with high frequency, in the case where the characteristic of the animal is that the animal does not like change of environment, when the living thing state estimator determines that the animal is not present, the control detail determiner selects a control detail that indicates an operation for causing the air cleaner to perform air cleaning, in the case where the characteristic of the animal is that the animal is sensitive to stress, when the living thing state estimator determines that the animal is present, the control detail determiner selects a control detail that indicates an operation for causing the air cleaner to generate aroma scent that reduces stress, and in the case where the characteristic of the animal is that the animal is sensitive to dryness or moisture, when the living thing state estimator determines that the animal is present, the control detail determiner selects a control detail that indicates an operation for causing the air cleaner to humidify or dehumidify air so as to achieve a temperature or a humidity associated with the animal or a predetermined temperature or humidity.

For instance, the following control may be performed in adjustment of the optical output of an illumination device in accordance with the determined control detail, the illumination device corresponding to the device 101(*f*).

For instance, when the living thing state estimator 1402 estimates that an animal is present in the space in which the illumination device is installed and the animal is in the sleeping state, a control command is transmitted to the illumination device via a network, the control command for performing the control detail of reducing the illumination intensity of the illumination device.

Also, when the living thing state estimator 1402 estimates that an animal is present in the space in which the illumination device is installed and the animal is in the sleeping state, an illumination intensity of the illumination device is increased stepwise during a time period in which the state of the animal should change from sleeping state to awake state. In this case, the information related to the time period in which the state of the animal should change from sleeping state to awake state is stored in the recorder 1404, and the cloud server 111 includes a timer which is not illustrated. When the timer detects start of the time period, a control command is transmitted to the illumination device via a network, the control command for performing the control detail of increasing the illumination intensity of the illumination device stepwise.

Also, when the living thing state estimator 1402 estimates that an animal is present in the space in which the illumination device is installed, a control command is transmitted to the illumination device via a network, the control command for performing the control detail of reducing the intensity of illumination of the space in which the animal is present in order to move the animal to a target space.

In conjunction with this, a control command is transmitted to another illumination device installed in the target space via a network, the control command for performing the control detail of increasing the illumination intensity of the another illumination device. In this manner, it is possible to induce the animal to move to the target space.

In this case, it is sufficient that another illumination device installed in the target space be connected to the cloud server 111 via a network, for instance, and the another illumination device include an information transmitter and receiver to transmit and receive information.

Also, when the living thing state estimator 1402 estimates that an animal is present in the space in which the illumination device is installed, at least one of the color combination, intensity of the illumination device, and frequency band of the light source is changed in order to reduce stress of the animal. In this case, it is sufficient that information on the color combination of illumination, the illumination intensity, and/or the frequency band of the light source that reduce stress of the animal be held in (set to) the cloud server 111 in advance.

These pieces of information may be registered in the cloud server 111 in advance by a user.

When there are a plurality of types of animals to be estimated for the presence in the space in which the illumination device is installed, the information on the color combination of illumination, the illumination intensity, and/or the frequency band of the light source that reduce stress may be registered in the cloud server 111 according to each type of animal.

When the living thing state estimator 205 estimates that an animal is present in the space in which the illumination device is installed, the pieces of information are referenced from the recorder 204, a control command is transmitted to the illumination device via a network, the control command for performing the control detail of changing at least one of the color combination, intensity of the illumination device, and frequency band of the light source.

That is, the second electronic device is a first illumination device installed in the predetermined space, and an operation indicated by a control detail according to a state in which the animal is sleeping specifies an instruction to cause the first illumination device to reduce an illumination intensity of the first illumination device or to increase an illumination intensity stepwise during a time period in which the animal is scheduled to be woken up.

In addition, the second electronic device is a first illumination device installed in the predetermined space, and the network is further connected to a second illumination device installed in a target space to which the animal is intended to be moved, an operation indicated by a control detail according to a state in which the animal is awake specifies an instruction to cause the first illumination device to reduce an illumination intensity of the first illumination device installed in the predetermined space for moving the animal to the target space and to cause the second illumination device to increase an illumination intensity of the second illumination device installed in the target space.

Also, the second electronic device is a first illumination device installed in the predetermined space, and an operation indicated by a control detail according to a state in which the animal is awake or a state in which the animal is sleeping specifies an instruction to cause the first illumination device to perform at least one of: an operation to change a color of illumination light of the first illumination device to a color that reduces stress of the animal, an operation to change an intensity of illumination light of the first illumination device to an intensity that reduces stress of the animal, and an operation to change a frequency of light source of illumination light of the first illumination device to a frequency of light source that reduces stress of the animal.

A device control method for a server device that is connected to one or more electronic devices in a house via a network and that controls the one or more electronic devices, the device control method including: receiving information on a predetermined space from a first electronic device that is disposed in the predetermined space, the information being detected by the first electronic device; determining whether or not at least an animal other than a human is present in the space when the information on the predetermined space is received, and estimating a state of the animal that is determined to be present; and determining a control detail for a second electronic device disposed in the space, according to a result of the determination or the estimated state of the animal.

Also, the information on the space is an image or sensor data of the predetermined space, the information being obtained by the first electronic device, in the receiving, a plurality of the images or pieces of sensor data, which are detected by the first electronic device at different times, are received from the first electronic device, and in the estimating, the received images or pieces of sensor data are analyzed, and a state of the animal is thereby estimated.

The device control method further includes storing pieces of information on the space in relation to distinct times, the pieces of information being received in the receiving. In the estimating, whether or not an animal is present in the space is determined based on the information on the space, obtained by the first electronic device, and when it is determined that an animal is present in the space, a state of the animal is estimated using the pieces of information on the space with the distinct times.

It is to be noted that the preference tendency DB 1405 may be constructed in the recorder 1404, and preference related to control detail according to a state of user (human and animal) may be learned. That is, the control processor 1401 updates the tables for control detail determination such as the table 1601 and the table 1701 optimally as needed by analyzing the log information on the control command of a user to devices.

In this case, a unit that senses the status of use of devices may be used as the detector 201(*c*). For instance, the status of use of the devices of FIG. 14 is sensed and stored in the preference tendency DB 1405.

For instance, when a control detail corresponding to a common state illustrated in FIG. 17 is determined, a control command is transmitted from the cloud server 111 to the air conditioner, the control command for setting the temperature of the air conditioner, which is one of the devices, to 25 degrees for operation. Later, when a control command for setting the temperature of the air conditioner to another temperature from 25 degrees is sent from a remote control (not illustrated) of a user, this information is stored in the preference tendency DB 1405 as the status of use of the air conditioner.

For instance, as a result of analysis of the data stored in the preference tendency DB 1405, when change of the set temperature of the air conditioner from 25 degrees to another temperature occurs a predetermined number of times or more after a control detail corresponding to a common state is determined, the control detail is changed so that the post-change temperature is the set temperature of the air conditioner corresponding to a common state.

In this manner, the control detail for each device may be changed according to a preference of a user.

For instance, the number of times of use of a device which is not illustrated in FIG. 14, for instance, an automatic feeding machine that provides food and/or water may be sensed and stored in the preference tendency DB 1405. The number of times of use indicates the number of times of use per unit of period (for instance, one day, one month).

While an animal having a meal, the amount of food or water provided by an automatic feeding machine may be sensed and stored in the preference tendency DB 1405.

Also, timing (for instance, a time) of feeding food or water by an automatic feeding machine may be sensed and stored in the preference tendency DB 1405.

In this case, after a meal is finished, the amount of leftover food or water may be sensed and stored in the preference tendency DB 1405.

This is because, it is possible to estimate the amount of food or water taken by an animal based on the amount of leftover food or water.

For instance, by analyzing the preference tendency DB 1405, timing of feeding food or water by an automatic feeding machine may be determined such that feeding food or water at the time results in no leftover.

For instance, by analyzing the preference tendency DB 1405, a certain amount of food or water fed by an automatic feeding machine per meal may be determined such that feeding the certain amount of food or water results in no leftover.

Therefore, by analyzing the preference tendency DB, the timing (for instance, time) of feeding food or water by an automatic feeding machine and the amount of food or water may be determined based on the preference of the animal.

For instance, when a user uses the automatic feeding machine for the first time, information on the number of use of the automatic feeding machine per unit of time period, the amount of food or water, and timing of feeding food or water are registered as control details, and a control command is transmitted to the automatic feeding machine based on the details.

Information is stored in the preference tendency DB 1405 as the number of operations of the automatic feeding machine increases.

By analyzing the preference tendency DB 1405, timing of feeding food or water by the automatic feeding machine and the amount of food or water may be changed.

In this manner, timing of feeding food or water by the automatic feeding machine and the amount of food or water may be changed according to the preference of the animal.

The cloud server 111 is capable of managing and analyzing huge amount of information (big data). Thus, log information of devices and/or sensing information are stored in the preference tendency DB 1405 in this manner, and it is possible to learn the preference of users or animals. Thus, in contrast to the first embodiment (FIG. 2), more comfortable service may be provided. Also, combined analysis of information obtained from the devices of other users by the cloud server 111 allows a new valuable service to be provided.

For instance, the control processor 1401 may analyze operational status of devices between users who keep animals of the same kind, and a device and its mode which are used most frequently may be recommended. With this configuration, the electronic device may be automatically controlled based on the preference of the animal estimated from the past state of the animal and the current state of the animal and on the preference tendency of other animals of the same kind. For instance, a liking for a video is recognized based on a response (the pet continued to watching or the pet lost interest and moved away) to videos reproduced for a pet in the past, and the order of reproduction is determined adopting mainly those programs that received good response. In order to get used to uninteresting video and sound little by little for training purpose, a short video is repeatedly reproduced, or reproduction order is determined such that uninteresting sound is repeatedly reproduced from soft sound to loud sound. In this manner, reproduction of pleasant video or sound is achieved for each pet, and thus an educational program for the pet may be automatically achieved in a natural situation.

That is, the control detail determiner of the electronic device has a preference tendency database including general preference tendency of control detail according to a type of animal, and the control detail determiner selects a candidate for the control detail based on the preference tendency DB, and further learns records related to reactions of the animal to previous control detail and adjusts determination on the control detail, the records being registered in the preference tendency database.

It is to be noted that in step S1504 a device to be controlled may be identified then a control detail may be determined. Depending on the situation of presence and activity of a human and/or an animal, it is better to control some devices automatically by the system, but this is not the case with other devices. For instance, when a human is "awake" and an animal "awake", the control detail to be performed on the air conditioner is automatically determined to be a common mode in accordance with the table 1601 illustrated in FIG. 16. However, some users may feel that it is convenient not to automatically control an illumination device and a TV set.

That is, in step S1504, first, the control detail determiner 1403 may select a device to be controlled according to an estimated situation, and subsequently, may determine a control detail for a device which is selected with reference to the tables 1601, 1701.

Also, a selection criterion for a device to be controlled according to a state may be in accordance with a criterion defined by a user in advance. For instance, for each of a plurality of devices to be controlled, information on priority is recorded on the recorder 1404. A device to be controlled may be selected according to the information on priority.

Alternatively, past log data may be stored in the preference tendency DB of the recorder 1404 and devices to be controlled may be learned to suit the preference of a user by analyzing the stored log data.

It is to be noted that a server that controls the electronic device has been described as the cloud server 111 connected via a network. However, the configuration of a device control server that controls the electronic device is not limited to this, and a local server, which is in a local environment and connected to the same network as that of an electronic device in a house, may serve as a Gateway. The electronic device itself may be provided with a device control server function that controls the electronic device.

Specifically, a device provided with the device control server function includes a TV set, a recorder unit used for program recording, a set top box used for cable TV, and a device control terminal in a house, such as a sunlight panel capable of comprehensively operating electronic devices in a house.

Additionally, a device provided with the device control server function includes, for instance, a monitor disposed in a room of a hotel, an illumination device connected via a network, and a smartphone or a tablet terminal which is carried by a user temporarily or all the time.

Also, a device provided with the device control server function may be, for instance, a wearable terminal which is a wrist watch, or glasses type or pendant type terminal to be worn by a user.

Like this, the configuration of the device provided with the device control server function has a wide variety.

Herein, a description has been given by using a TV set, an air cleaner, and an illumination device as the electronic device to be controlled. However, the electronic devices to be controlled and their determination criterion and control detail are not limited to those.

For instance, although different from the shape of TV, a projector that projects a video on a wall surface, a terminal with a screen prepared for animals only, and a display signage embedded into the floor may be an electronic device to be controlled.

For instance, a moving display that perform automatic running or automatic flight may be an electronic device to be controlled.

For instance, a humidifier and a dehumidifier capable of controlling air or aroma scent may be an electronic device to be controlled.

For instance, an electrical control unit for a curtain or a blind responsible for lighting for a window or an entrance may be an electronic device to be controlled.

For the sake of simplified description, the determination criterion have been described from the viewpoint as to whether or not a video is outputted in the sleeping state and/or activity state. However, the determination criterion for control is not limited to this, and the state of activity history of an animal, for instance, the animal is not so active today, desire presumed from a cry, and magnitude of a stress reaction presumed from a vibrational state of the animal may be determination criterion.

Also, control detail is not limited to video output to the screen of an electronic device, control of scent, and stress relief and release of an animal by dimming ON/OFF of illumination.

For instance, a video for which the animal instinctively wants to chase is outputted on a wall, a ceiling, or a floor and may be changed significantly so as to promote physical exercise of the animal and guide the animal to overcome lack of physical exercise.

Also, when physical exercise history having a certain standard as one of control details is observed as a state, control may be performed to maintain the health of the animal by a performance-based reward method such as releasing food from an automatic feeding machine.

Herein, an example has been described in which the living thing state estimator 205 analyzes the current data obtained from the detector 201 (for instance, a sensor or a camera) and estimates the current state of the animal. However, input data used for determination criterion for determining control detail is not limit to the current state estimation.

The living thing state estimator 205 compares, for instance, the state change from the past state to the current state with the data in the past, and may select and adopt a content, which has successful record of causing a change from a bad state to a good state in the past in a situation similar to the past data, according to the current state, the content being based on the type of the animal or on the preference specific to the animal.

Here, the good state is a state which is one of the states of the animal estimated by the living thing state estimator 205 and which is considered to be desirable by a user. Also, the bad state is a state which is one of the states of the animal estimated by the living thing state estimator 205 and which is considered to be undesirable by a user.

Also, selection of a content may be controlled according to hours, a weather, a season, and the number of animals. For instance, when a sudden shower or lightning strike is forecast while a dog stays home alone, change of the outside situation is adopted as a video, and in case of sudden sound such as a thunder, a squall video with a change of from soft sound to loud sound is adopted. When the animal is a child dog, a video which makes it relieved is adopted and when the animal is an adult dog, a video, which gives imagination of going hunting bravely, is adopted, that is, a video to be adopted is varied.

It is to be noted that as the past data, actual results data of a pet dog kept by a user may be used or the record value and its average value for the same kind of dogs or similar dogs (dog type, age, sex) may be used. Furthermore, when change to an expected state is not made within a certain period of time or change to a bad state is made, the priority of output content is defined according to the past data and control is performed successively on content in descending order to the priority.

Figure 18:
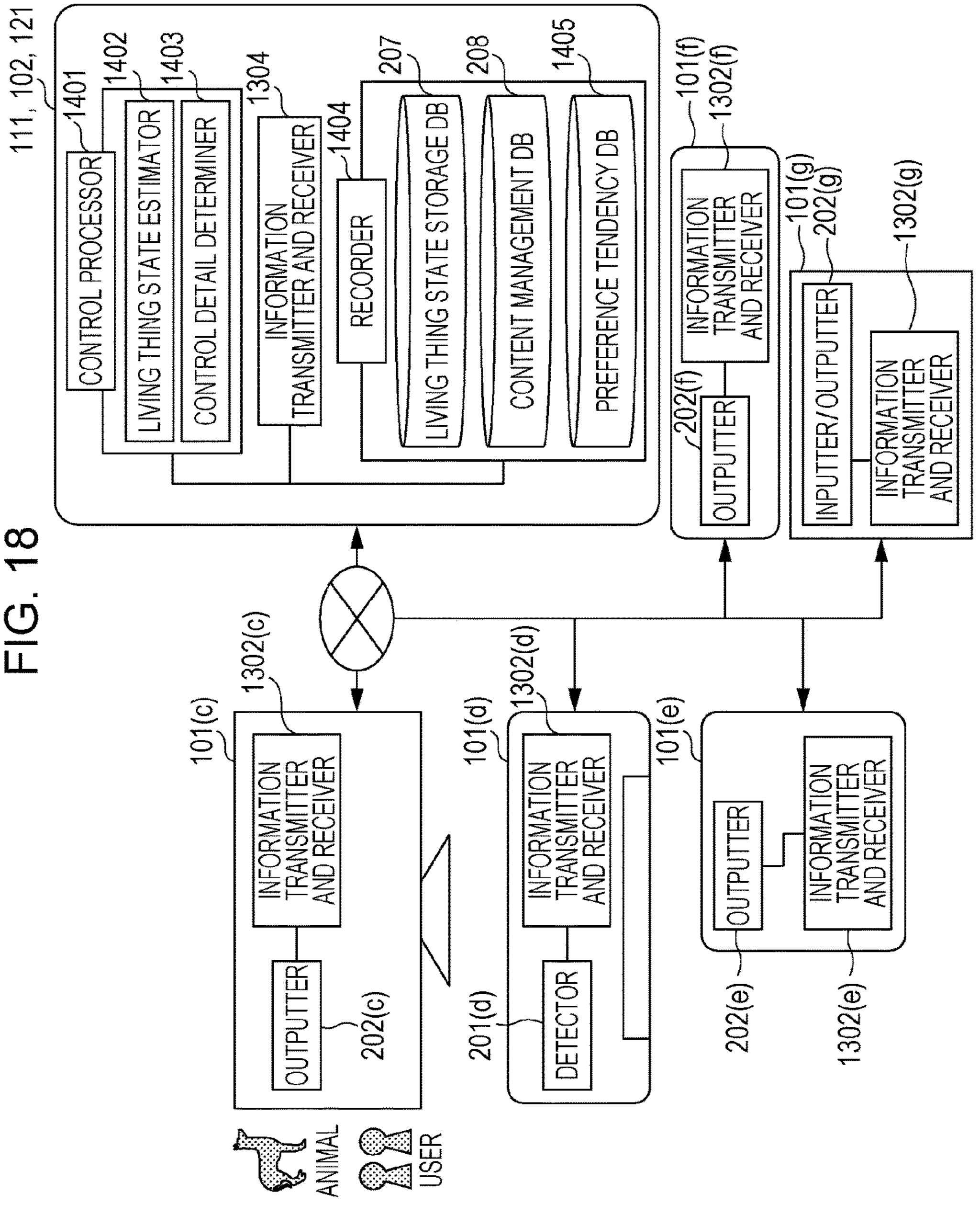
FIG. 18 is a diagram illustrating an example of a configuration of the electronic devices and a cloud server in a modification of the second embodiment.

FIG. 18 is a diagram illustrating an example of a configuration of electronic devices and a cloud server in a modification of the second embodiment. As in FIG. 18, the detector 201(*d*) may be mounted in the air conditioner (device 101(*d*)).

In the example illustrated in FIG. 18, information detected by the detector 201(*d*) included in the air conditioner (device 101(*d*)) and information obtained by the air conditioner or the like are transmitted to the cloud server 111. Based on the information received from the air conditioner, the cloud server 111 determines whether or not a human or an animal is present in the space (room) in which the air conditioner and a TV set are disposed. When a human or an animal is present, the cloud server 111 estimates a state of the human or the animal.

The TV set (device 101(*c*)) may be controlled based on the state of the human or the animal, estimated by the cloud server 111. That is, it is sufficient that a detector be mounted on one of the devices owned by a user. A description of FIG. 18 is omitted because FIG. 18 is the same as FIG. 14 except for that the detector 201(*c*) of the device 101(*c*) is replaced by the outputter 202(*c*), and the outputter 202(*d*) of the device 101(*d*) is replaced by the detector 201(*d*).

Figure 19:
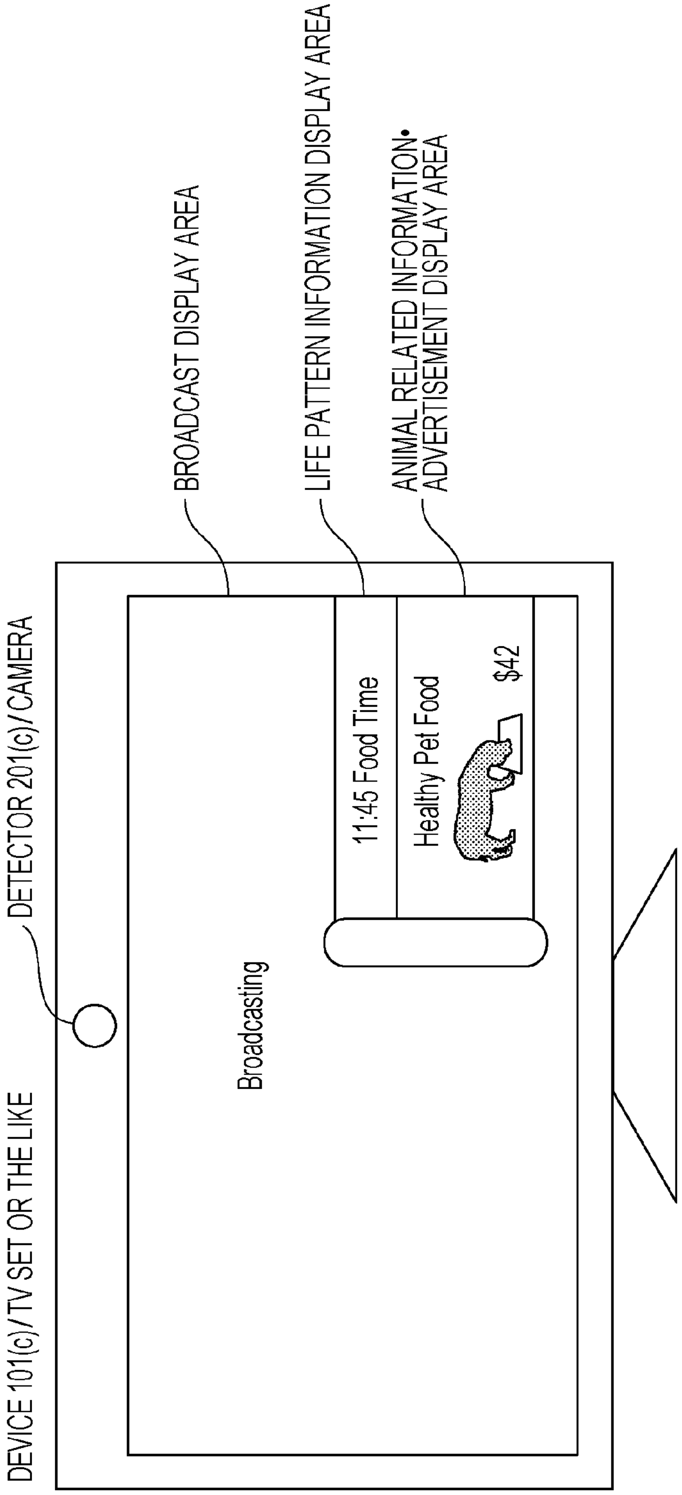
FIG. 19 is a diagram illustrating an example of information display of the electronic devices in the second embodiment.

FIG. 19 is a diagram illustrating an example of information display of the electronic devices in the second embodiment. Specifically, FIG. 19 is a diagram illustrating a modification that displays information according to a state of a human or an animal, estimated by the cloud server 111 when the device 101(*a*) illustrated in FIG. 14 is a TV set.

For instance, when a human is estimated to be present (an animal is not present or present) as a result of estimating a state by the cloud server 111 based on the information detected by the detectors 201(*c*) such as a camera, information as illustrated in FIG. 19 is displayed.

In FIG. 19, display for notifying of timing for meal and physical exercise of animal is displayed on Life Pattern Information Display Area, and information such as advertisement for pet food is displayed on Animal Related Information, Advertisement Display Area. Life Pattern Information Display Area and Animal Related Information, Advertisement Display Area are displayed in part of Broadcast Display Area as illustrated temporarily or until a user issues a delete instruction.

The display timing and the content for Life Pattern Information Display Area may be recommended timing and content which have been set in advance in the device 101(*c*), the device 101(*d*), or the cloud server 111.

Alternatively, a user may set a display timing and a content in the device 101(*c*), the device 101(*d*), or the cloud server 111.

That is, in the case where a human is estimated to be present (an animal is not present or present) and when a predetermined preset time comes, predetermined detail of preset information (for instance, information prompts for eating and physical exercise for an animal) is displayed.

The advertisement displayed on Animal Related Information, Advertisement Display Area is preferably related to the information displayed on Life Pattern Information Display Area in real time. That is, while information prompting for eating is displayed, advertisement for pet food may be displayed. Also, while information prompting for going for a walk is displayed, advertisement of products for walking with pet may be displayed. Instead of advertisement, information on recommendation of the most suitable video to be reproduced may be displayed on Animal Related Information, Advertisement Display Area according to a situation. While such information is displayed, it may be designed to allow a user to reproduce the recommended video by a simple operation such as a remote control or voice-input.

That is, for instance, a predetermined video or sound outputted by the outputter 202(*d*) of the electronic device 101(*d*) is a content programmed for forming a life pattern of the animal, and is a video or sound including timing for feeding food, an amount of food, a method of feeding, a target weight and change in weight, and advice information for life of the animal, or is an icon or an advertisement space which is displayed on a screen to prompt for reproduction of the video or sound.

With this configuration, it is possible to avoid a situation in which the owner forgets to feed a pet while watching TV. Because information and advertisement are displayed based on the estimation of the current situation, unnecessary information is not displayed at bad timing. Also control may be performed to allow information to be automatically displayed on the electronic device via an icon, an ad frame, and sound based on an ideal life pattern formation for the animal. Thus, for instance, when the owner and the pet are watching TV together, an icon may be display on the screen to inform the owner of feeding time for the pet, thereby making it possible to present a rhythm for life pattern to the owner. Furthermore, the advertisement allows the owner to recognize the most suitable pet food for the pet and pet toys for promoting exercise of the pet.

The techniques described in the aspect above may be achieved, for instance, by the models of cloud service below. However, the model that achieves the techniques described in the aspect is not limited to these.

(Service Model 1: Company Data Center Model)

Figure 20:
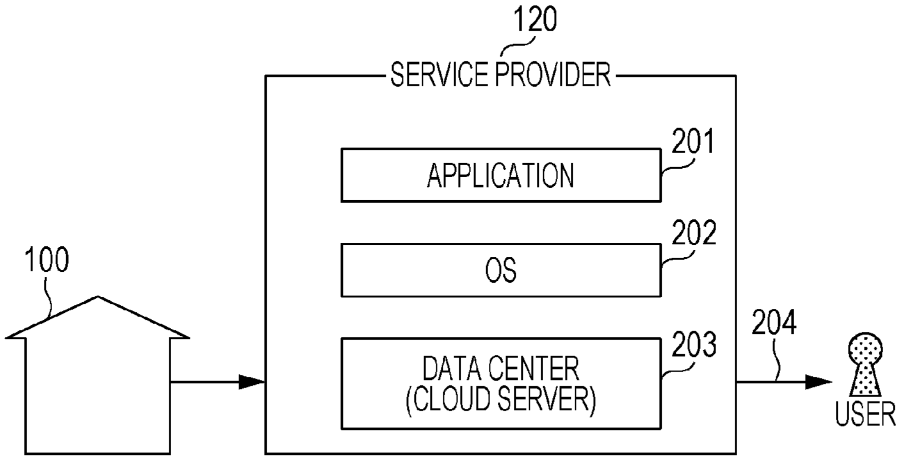
FIG. 20 is a diagram illustrating service model 1 (company data center model)

FIG. 20 is a diagram illustrating service model 1 (company data center model). In the present model, the service provider 120 obtains information from the group 100 and provides service to a user. In the present model, the service provider 120 has the function of a data center operating company. That is, the service provider 120 holds the cloud server 111 that manages big data. Therefore, a data center operating company is not involved.

In the present model, the service provider 120 administers and manages data center (the cloud server 111) (203). The service provider 120 also manages OS (202) and application (201). The service provider 120 provides service (204) using the OS (202) and the application (201) that are managed by itself.

(Service Model 2: IaaS Use Model)

Figure 21:
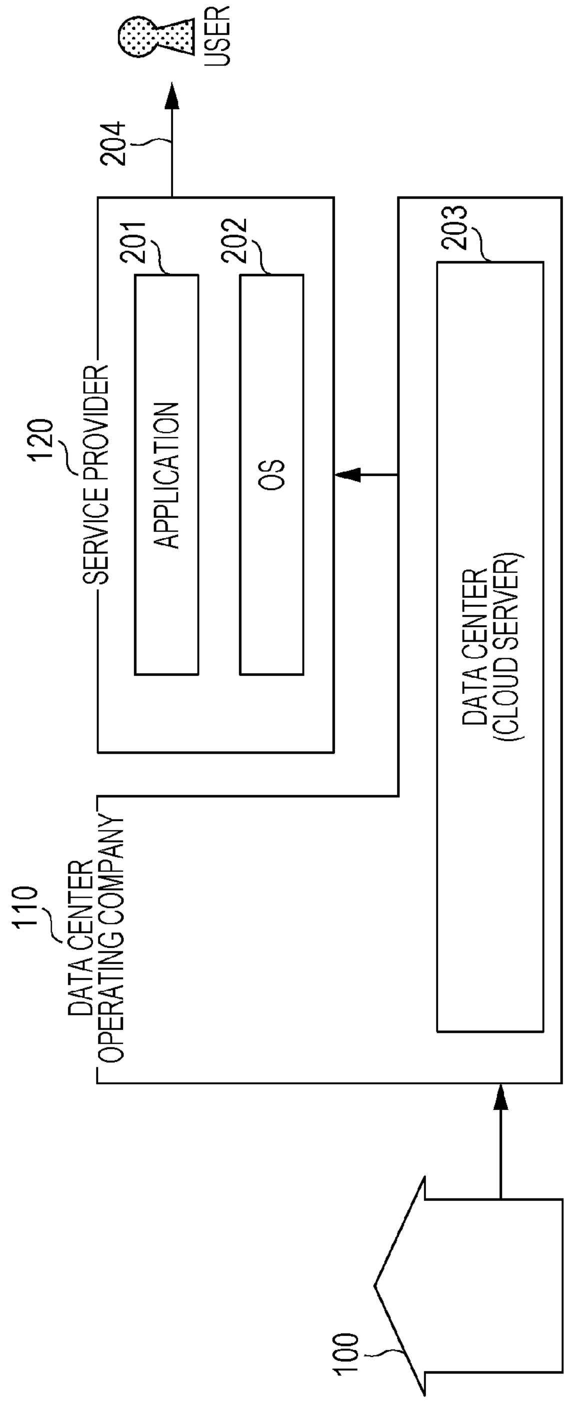
FIG. 21 is a diagram illustrating service model 2 (IaaS use model)

FIG. 21 is a diagram illustrating service model 2 (IaaS use model). Here, IaaS is an abbreviation of infrastructure as a service, and refers to cloud service provision model that provides the foundation for implementing and operating a computer system, as the service via the Internet.

In the present model, the data center operating company administers and manages the data center (the cloud server 111) (203). The service provider 120 manages the OS (202) and the application (201). The service provider 120 provides service (204) using the OS (202) and the application (201) that are managed by itself.

(Service Model 3: PaaS Use Model)

Figure 22:
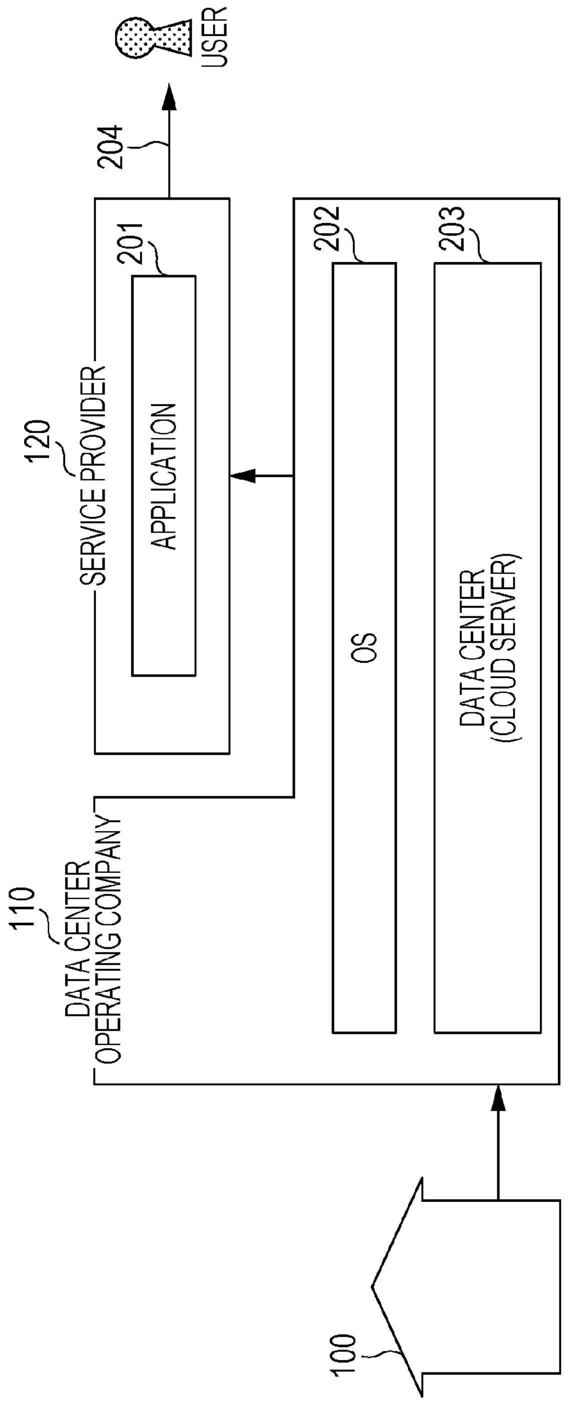
FIG. 22 is a diagram illustrating service model 3 (PaaS use model)

FIG. 22 is a diagram illustrating service model 3 (PaaS use model). Here, PaaS is an abbreviation for platform as a service, and refers to cloud service provision model that provides a platform as the service via the Internet, the platform serving as the foundation for implementing and operating software.

In the present model, the data center operating company 110 manages the OS (202), and administers and manages the data center (the cloud server 111) (203). The service provider 120 manages the application (201). The service provider 120 provides service (204) using the OS (202) managed by a data center operating company and the application (201) managed by the service provider 120.

(Service Model 4: SaaS Use Model)

Figure 23:
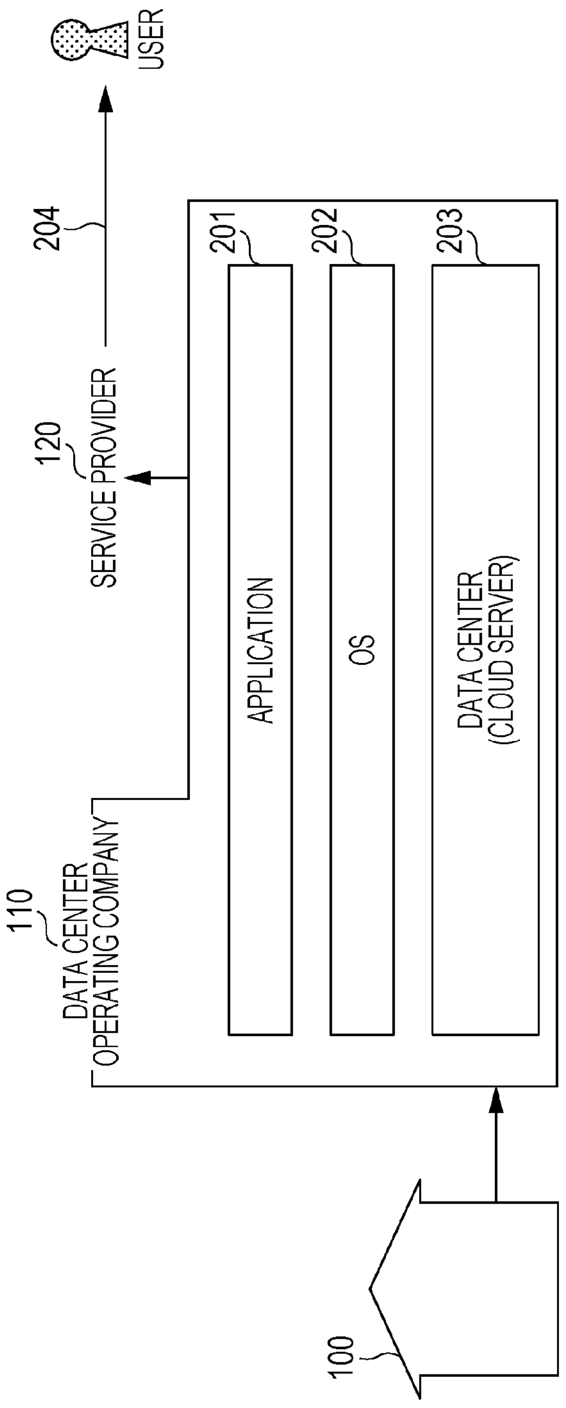
FIG. 23 is a diagram illustrating service model 4 (SaaS use model).

FIG. 23 is a diagram illustrating service model 4 (SaaS use model). Here, SaaS is an abbreviation for software as a service, and refers to cloud service provision model that has the function of enabling a company or an individual (user) who does not hold a data center (cloud server) to use application via a network such as the Internet, the application being provided by a platform provider that holds a data center (cloud server), for instance.

In the present model, the data center operating company 110 manages the application (201) and the OS (202), and administers and manages the data center (the cloud server 111) (203). The service provider 120 provides service (204) using the OS (202) and the application (201) managed by the data center operating company 110.

In each of the models above, the service provider 120 provides service. For instance, the service provider or the data center operating company may develop a database of OS, application, and/or big data or may outsource to a third party.

The device control method for electronic device according to the present disclosure is applicable to any household and non-household electronic device. In addition, the electronic device and the device control method according to the present disclosure are applicable to a vehicle such as an automobile and a moving object such as an airplane.

What is claimed is:

1. An electronic device comprising:

a living thing state estimator that determines whether or not at least an animal other than a human is present in a space in which the electronic device is disposed, based on information on the space, and estimates a state of the animal that is determined to be present, the information being detected by a detector;

a control detail determiner that determines a control detail for the electronic device, according to a result determined by the living thing state estimator or the estimated state of the animal; and an outputter that performs a predetermined operation, wherein, as long as the state of the animal is estimated to be an awake state by the living thing state estimator or when a change in the state of the animal from a sleeping state to the awake state is estimated by the living thing state estimator, the control detail determiner causes the outputter to perform an operation, as the predetermined operation, which is indicated by the control detail corresponding to the awake state.

2. The electronic device according to claim 1, wherein, as long as the state of the animal is estimated to be the sleeping state by the living thing state estimator, the control detail determiner causes the outputter to perform an operation, as the predetermined operation, which is indicated by the control detail corresponding to the sleeping state, or when a change in the state of the animal from the awake state to the sleeping state is estimated by the living thing state estimator, the control detail determiner causes the outputter to stop the operation which is indicated by the control detail corresponding to the awake state.

3. The electronic device according to claim 2, wherein the predetermined operation includes an operation of reproducing a video and an operation of reproducing sound, the operation indicated by the control detail corresponding to the awake state of the animal is an operation of causing the outputter to reproduce a video or sound corresponding to the awake state, and the operation indicated by the control detail corresponding to the sleeping state of the animal is an operation of causing the outputter to reproduce a video or sound corresponding to the sleeping state.

4. The electronic device according to claim 2, wherein the predetermined operation includes an operation of adjusting an optical output of illumination, the operation indicated by the control detail corresponding to the awake state of the animal is an operation of causing the outputter to adjust an optical output of illumination corresponding to the awake state, and the operation indicated by the control detail corresponding to the sleeping state of the animal is an operation of causing the outputter to adjust an optical output of illumination corresponding to the sleeping state.

5. The electronic device according to claim 2, wherein the predetermined operation includes an operation of air cleaning to remove a smell and an operation of generating a scent, the operation indicated by the control detail corresponding to the awake state of the animal is an operation of causing the outputter to perform air cleaning to remove a smell, corresponding to the awake state, or an operation of causing the outputter to perform scent generation corresponding to the awake state, and the operation indicated by the control detail corresponding to the sleeping state of the animal is an operation of causing the outputter to perform air cleaning to remove a smell, corresponding to the sleeping state, or an operation of causing the outputter to perform scent generation corresponding to the sleeping state.

6. The electronic device according to claim 1, wherein the information on the space detected by the detector is an image of the space captured by an image capture device provided in the electronic device or an external image capture device connected to the electronic device, the living thing state estimator determines that an animal other than a human is present in the space by analyzing the image captured by the image capture device, and the living thing state estimator further estimates whether or not the state of the animal is the awake state by analyzing a change in a plurality of images with different image capturing times.

7. The electronic device according to claim 1, wherein the information on the space detected by the detector is sensor data in the space detected by a sensor provided in the electronic device or an external sensor connected to the electronic device, the living thing state estimator determines that an animal other than a human is present in the space by analyzing the sensor data detected by the sensor, and the living thing state estimator further estimates whether or not the state of the animal is the awake state by analyzing a change in a plurality of pieces of the sensor data with different acquisition times.

8. The electronic device according to claim 1, wherein the living thing state estimator further determines whether or not a human is present and whether or not an animal other than a human is present in the space based on the information on the space in which the electronic device is disposed, and estimates a state of the human or the animal that is determined to be present, and the control detail determiner changes the control detail of the electronic device according to the result determined by the living thing state estimator or the estimated state of the human or the animal.

9. The electronic device according to claim 8, wherein when the living thing state estimator determines one of (1) a state in which a human and an animal are present, (2) a state in which only an animal is present and no human is present, (3) a state in which only a human is present and no animal is present, and (4) a state in which neither a human nor an animal is present, the control detail determiner changes the control detail for the electronic device according to the determined state.

10. The electronic device according to claim 9, wherein the outputter reproduces a video or sound, and when the living thing state estimator determines the state in which no human is present and only an animal is present and as long as the animal is estimated to be in the awake state, the control detail determiner causes the outputter to reproduce a video or sound which is indicated by a control detail according to the estimated state of the animal.

11. The electronic device according to claim 10, wherein when the living thing state estimator determines the state in which no human is present and only an animal is present and as long as the animal is estimated to be in the awake state, the control detail determiner causes the outputter to reproduce a video or sound which is indicated by the control detail according to the estimated state of the animal, and when the determination by the living thing state estimator is changed from the state in which the animal is present and no human is present to the state in which the animal and human are present or when the estimation on the state of the animal by the living thing state estimator is changed from the awake state to the sleeping state, the control detail determiner causes the outputter to stop reproduction of the video or the sound, or causes the outputter to reproduce a video or sound which is indicated by a control detail according to the changed state of the animal.

12. The electronic device according to claim 10, wherein a video to be reproduced by the outputter of the electronic device is reproduced with a refresh rate of a video which is visually recognizable by the animal, and sound to be reproduced by the outputter is reproduced with adjusted audio frequencies audible by the animal.

13. The electronic device according to claim 1, wherein the control detail determiner of the electronic device includes a scheduler that manages an order of a plurality of control details to be used in a time sequence, the scheduler holds a table that specifies target activities intended to be directed to the animal, a time at which each of the target activities is directed, and a control detail according to each target activity, and the scheduler causes the electronic device to reproduce a video or sound indicated by the control detail according to each target activity at a time at which the target activity is directed.

14. The electronic device according to claim 1, wherein a state of the human is a state of a user who is an owner of the animal, the electronic device further includes a living thing state storage database that stores temporal transition of the state of the animal and temporal transition of the state of the user, and the living thing state estimator learns a life pattern of the animal or a life pattern of the user from the temporal transition of the state of the animal and the temporal transition of the state of the user that are stored in the living thing state storage database, and predicts a transition of the state of the animal or a transition of the state of the user from the learned life pattern of the animal or life pattern of the user.

15. The electronic device according to claim 1, wherein the control detail determiner of the electronic device includes a preference tendency database including general preference tendency of control detail according to a type of animal, and the control detail determiner selects a candidate for the control detail based on the preference tendency database, and further learns records related to reactions of the animal to previous control detail and adjusts determination on the control detail, the records being registered in the preference tendency database.

16. The electronic device according to claim 10, wherein a predetermined video or sound outputted by the outputter of the electronic device is a content programmed for forming a life pattern of the animal, and is a video or sound including timing for feeding food, an amount of food, a method of feeding, a target weight and change in weight, and advice information for life of the animal, or is an icon or an advertisement space which is displayed on a screen to prompt for reproduction of the video or sound.

17. The electronic device according to claim 1, wherein at least one of the living thing state estimator and control detail determiner includes a processor.

18. An electronic device system comprising:

an information transmitter and receiver that transmits and receives information via a network to and from a first electronic device and a second electronic device installed in a predetermined space;

a living thing state estimator that determines whether or not at least an animal other than a human is present based on the information on the predetermined space, and estimates a state of the animal that is determined to be present, the information on the predetermined space being detected by a detector included in the first electronic device and being received by the information transmitter and receiver; and a control detail determiner that determines a control detail for the second electronic device, according to a result determined by the living thing state estimator or the estimated state of the animal, wherein the information transmitter and receiver transmits, to the second electronic device via the network, the information for performing an operation indicated by the determined control detail, the second electronic device comprises a first illumination device installed in the predetermined space, and an operation indicated by a control detail according to a state in which the animal is sleeping specifies an instruction to cause the first illumination device to reduce an illumination intensity of the first illumination device or to increase an illumination intensity stepwise during a time period in which the animal is scheduled to be woken up.

19. A device control method for a server that is connected to one or more electronic devices in a house via a network and that controls the one or more electronic devices, the device control method comprising:

receiving information on a predetermined space from a first electronic device that is disposed in the predetermined space, the information on the predetermined space being detected by the first electronic device;

determining whether or not at least an animal other than a human is present in the predetermined space when the information on the predetermined space is received;

estimating a state of the animal that is determined to be present; and determining a control detail for a second electronic device disposed in the predetermined space, according to a result of the determining whether or not at least an animal is present or the estimated state of the animal, wherein the information on the predetermined space comprises an image or sensor data of the predetermined space obtained by the first electronic device, in the receiving, a plurality of images or pieces of sensor data, which are obtained by the first electronic device at different times, are received from the first electronic device, and in the estimating, the state of the animal is estimated by analyzing the received plurality of images or pieces of sensor data.

20. The device control method according to claim 19, further comprising storing pieces of information on the predetermined space in relation to distinct times, the pieces of information being received in the receiving, wherein, whether or not at least an animal is present in the predetermined space is determined based on the information on the predetermined space, obtained by the first electronic device, and when it is determined that at least an animal is present in the predetermined space, the state of the animal is estimated using the pieces of information on the predetermined space with the distinct times.

* * * * *